US012455052B2

(12) United States Patent
Bretschneider et al.

(10) Patent No.: US 12,455,052 B2
(45) Date of Patent: Oct. 28, 2025

(54) LUMINAIRE AND LIGHTING CONTROL SYSTEM

(71) Applicant: QUARKSTAR LLC, Las Vegas, NV (US)

(72) Inventors: Eric Bretschneider, Corinth, TX (US); Cary Nevin Eskow, San Diego, CA (US); Andrew Stuart Gladwin, Brentwood Bay (CA); Louis Lerman, Las Vegas, NV (US)

(73) Assignee: Quarkstar LLC, Las Vegas, NV (US)

( * ) Notice: Subject to any disclaimer, the term of this patent is extended or adjusted under 35 U.S.C. 154(b) by 0 days.

(21) Appl. No.: 18/715,619

(22) PCT Filed: Dec. 1, 2022

(86) PCT No.: PCT/US2022/051571

§ 371 (c)(1),
(2) Date: May 31, 2024

(87) PCT Pub. No.: WO2023/102138

PCT Pub. Date: Jun. 8, 2023

(65) Prior Publication Data

US 2025/0027624 A1 Jan. 23, 2025

Related U.S. Application Data

(60) Provisional application No. 63/396,199, filed on Aug. 8, 2022, provisional application No. 63/303,951, filed (Continued)

(51) Int. Cl.

| | |
|---|---|
| ***F21S 4/28*** | (2016.01) |
| ***F21V 9/30*** | (2018.01) |
| *F21Y 113/13* | (2016.01) |

(52) U.S. Cl.
CPC .................. *F21S 4/28* (2016.01); *F21V 9/30* (2018.02); *F21Y 2113/13* (2016.08)

(58) Field of Classification Search
CPC ............ F21S 4/28; F21V 9/30; F21Y 2113/13
See application file for complete search history.

(56) References Cited

U.S. PATENT DOCUMENTS

| | | | | |
|---|---|---|---|---|
| 9,345,092 B2 * | 5/2016 | Dau | H05B 45/14 | |
| 2015/0233536 A1 * | 8/2015 | Krames | F21K 9/232 | 362/84 |

(Continued)

FOREIGN PATENT DOCUMENTS

| | | | |
|---|---|---|---|
| EP | 3835647 | | 6/2021 |
| TW | I709711 B | * | 11/2020 |

OTHER PUBLICATIONS

TW-I709711-B, machine translation, 2020 (Year: 2020).*
International Search Report and Written Opinion in International Appln. No. PCT/US2022/051571, mailed on May 15, 2023, 20 pages.
Lfenergy.com [online], "OpenLEADR," upon information and belief, available no later than Dec. 1, 2022, retrieved on May 31, 2024, retrieved from URL<https://lfenergy.org/projects/openleadr/>, 5 pages.

(Continued)

*Primary Examiner* — Tracie Y Green
(74) *Attorney, Agent, or Firm* — Fish & Richardson P.C.

(57) ABSTRACT

A device includes a LED die having a peak emission at a blue or shorter wavelength, a LED die having a peak emission at a red, orange, yellow, green, or cyan wavelength, and a homogenous light conversion material positioned to receive light emitted from the LED dies. The light conversion material including: (i) a first phosphor compound having a peak emission at a green wavelength; (ii) a second phosphor compound having a peak emission at an orange wavelength; and (iii) a third phosphor compound having a peak emission at a red, orange, yellow, green, or cyan wavelength. The device is a packaged LED device and a relative concentration of the phosphor compounds and a relative luminosity of the LED dies are selected so the device emits white light satisfying a preference P1 and a (Continued)

fidelity F3 according to a TM-30 standard for color rendering.

14 Claims, 12 Drawing Sheets

Related U.S. Application Data on Jan. 27, 2022, provisional application No. 63/301,433, filed on Jan. 20, 2022, provisional application No. 63/285,003, filed on Dec. 1, 2021.

(56) References Cited

U.S. PATENT DOCUMENTS

| | | | | |
|---|---|---|---|---|
| 2016/0218254 | A1 | 7/2016 | Jacobson et al. | |
| 2016/0223146 | A1* | 8/2016 | Vick | C09K 11/0883 |
| 2016/0290573 | A1* | 10/2016 | Allen | H05B 45/20 |
| 2019/0341531 | A1* | 11/2019 | Zhang | H10H 20/8513 |
| 2020/0179716 | A1 | 6/2020 | Dutta | |

OTHER PUBLICATIONS

Onsemi.com [online] "Complete Connected LED Driver Power Solution: NCL31000, NCL31001," upon information and belief, available no later than Dec. 1, 2022, retrieved on May 31, 2024, retrieved from URL<https://www.onsemi.com/pdf/datasheet/ncl31000-d.pdf>, 44 pages.

Silabs.com [online], "AN1142: Mesh Network Performance Comparison," upon information and belief, available no later than Dec. 1, 2022, retrieved on May 31, 2024, retrieved from URL<https://www.silabs.com/documents/public/application-notes/an1142-mesh-network-performance-comparison.pdf>, 11 pages.

Thread.com [online], "Overview: What is Thread?," upon information and belief, available no later than Dec. 1, 2022, retrieved on May 31, 2024, retrieved from URL<https://www.threadgroup.org/What-is-Thread/Overview>, 3 pages.

Transphorm.com [online] "Product Portfolio: FETs Evaluation Kits Reference Designs," upon information and belief, available no later than Dec. 1, 2022, retrieved on May 31, 2024, retrieved from URL<https://www.transphormusa.com/en/document/product-one-sheet/>, 8 pages.

* cited by examiner

Design Intent
(The desired effect of color rendition on the illuminated environment)

| Priority Level (The balance between allowing for tradeoffs and increasing the likelihood of meeting the design intent) | Preference (P) | | Vividness (V) | | Fidelity (F) | |
|---|---|---|---|---|---|---|
| 1 | P1 | $R_f \geq 78$<br>$R_g \geq 95$<br>$-1\% \leq R_{cs,h1} \leq 15\%$ | V1 | $R_g \geq 118$<br>$R_{cs,h1} \geq 15\%$ | F1 | $R_f \geq 95$ |
| 2 | P2 | $R_f \geq 75$<br>$R_g \geq 92$<br>$-7\% \leq R_{cs,h1} \leq 19\%$ | V2 | $R_g \geq 110$<br>$R_{cs,h1} \geq 6\%$ | F2 | $R_f \geq 90$<br>$R_{f,h1} \geq 90$ |
| 3 | P3 | $R_f \geq 70$<br>$R_g \geq 89$<br>$-12\% \leq R_{cs,h1} \leq 23\%$ | V3 | $R_g \geq 100$<br>$R_{cs,h1} \geq 0\%$ | F3 | $R_f \geq 85$<br>$R_{f,h1} \geq 85$ |

FIG. 1A

LUMINAIRE AND LIGHTING CONTROL SYSTEM

FIELD OF TECHNOLOGY

The present technology relates to luminaires and lighting control systems.

BACKGROUND

Luminaires (also referred to as light fixtures) have become largely based on solid-state lighting and increasing amounts of electronic control. This can include electronic circuitry for powering light-emitting diodes (LEDs), dimming, color control, monitoring, and operation from switches, dimmers, and lighting control systems. Today's luminaires may be configured for standalone operation or provide connection into networks for remote operation, coordinated lighting control and/or monitoring. Efficiency, color rendering, control over white/color temperature, color tuning, monolithic and modular architectures, linear and other form factors, light distribution, and uniformity of illumination have become important considerations for luminaire design. Utility, appearance, and aesthetics remain determining factors for luminaires. Conventional luminaire forms include pendant, flush mount, recessed, wall mount, standing and other forms, for example.

Moreover, the quantification of subjective color rendering has evolved from being based on a single measure known as color rendering index (CRI) to multiple measures as defined in ANSI/IES TM-30. TM-30 also known as IES Method for Evaluating Light Source Color Rendition, which provides three categories that identify a Design Intent called Preference (P), Vividness (V) and Fidelity (F). The Design Intent identifies a desired effect of color rendition on an illuminated environment. Each Design Intent has three Priority Levels. Together they provide a metric for characterization of color rendering capabilities of a luminaire.

FIG. 1A shows recommended specification criteria from IES TM-30 Annex E based on Design Intent and Priority Level based on further detailed parameters. Preference 'P' can measure a quality of light. Fidelity 'F' can measure how accurately colors are reproduced compared to a standard source. Vividness 'V' can measure how saturated the colors are. The rating of each of these three measures can vary from 1-3, e.g., P1 is most preferred Preference, while F3 refers to the lowest ranking recommended Fidelity. The priority level can measure a balance between allowing for tradeoffs and increasing the likelihood of meeting the design intent, which can be the desired effect of color rendition on the illuminated environment. Preference can be characterized by $R_f$ (average color fidelity), $R_g$ (gamut area), and $R_{cs,h1}$ (chroma shift for nominally red objects). Vividness can be characterized by $R_g$ and $R_{cs,h1}$. Fidelity can be characterized by Rr and $R_{f,h1}$ (red color fidelity).

For example, P1, e.g., most preferred, can mean $R_f \geq 78$, $R_g \geq 95$, and $-1\% \leq R_{cs,h1} \leq 15\%$. P2 can mean $R_f \geq 74$, $R_g \geq 92$, and $-7\% \leq R_{cs,h1} \leq 19\%$. P3 can mean $R_f \geq 70$, $R_g \geq 89$, and $-12\% \leq R_{cs,h1} \leq 23\%$. V1 can mean $R_g \geq 118$, and $R_{cs,h1} \geq 15\%$. V2 can mean $R_g \geq 110$, and $R_{cs,h1} \geq 6\%$. V3 can mean $R_g \geq 100$, and $R_{cs,h1} \geq 0\%$. F1 can mean $R_t \geq 95$, F2 can mean $R_t \geq 90$, and $R_{f,h1} \geq 90$. F3 can mean $R_t \geq 85$, and $R_{f,h1} \geq 85$.

FIG. 1B shows a schematic representation of overlaps and possible combinations of TM-30 Design Intents (P, V, and F) and Priority Levels (1, 2, and 3). Notably, some design choices can be mutually exclusive. The vertical hatch represents V, the horizontal hatch represents P, and the diagonal hatch represents F. The shade of the background of each box, e.g., box V1, represents the value of the priority level, such that darker color represent higher scores, e.g., 1. The boxes are transparent to illustrate how the priority levels combine in different locations in the design space, e.g., the darker a region, the better the combined priority score.

In many lighting applications, design for Fidelity and Preference usually takes priority over Vividness. Nevertheless, high priorities in Design Intents are not necessarily independently achievable, e.g., a vividness V1 and a fidelity F1 are mutually exclusive. Generally, in ambient environments for humans, Preference is considered most important, followed by Fidelity. Adoption of TM-30 is still ongoing.

SUMMARY

In general, in a first aspect, the disclosure features a light emitting device, including a first LED die having a peak emission wavelength $L_1$ in a blue or shorter wavelength, a second LED die having a peak emission wavelength $L_2$ in a red, orange, yellow, green, or cyan wavelength, and a homogenous light conversion material positioned to receive light emitted from the first and second LEDs, the light conversion material including: (i) a first phosphor compound having a peak emission wavelength $L_{P1}$ in a green wavelength; (ii) a second phosphor compound having a peak emission wavelength $L_{P2}$ in an orange wavelength; and (iii) a third phosphor compound having a peak emission wavelength $L_{P3}$ in a red, orange, yellow, green, or cyan wavelength. The light emitting device is a packaged LED device and a relative concentration of the first, second, and third phosphor compounds in the homogenous light conversion material, and a relative luminosity of the first and second LEDs are selected so that the light emitting device, during operation, emits white light having a spectral power distribution satisfying a preference P1 and a fidelity F3 according to a TM-30 standard for color rendering.

Examples of the light emitting device can include one or more of the following features and/or features of other aspects. For example, both $L_2$ and $L_{P3}$ can include a red wavelength.

$L_2$ can include a red and a cyan wavelength and $L_{P3}$ includes a red and a cyan wavelength.

During operation, a luminaire containing the light-emitting device can output light having at least F2 fidelity according to the TM-30 standard for color rendering. During operation, the luminaire containing the light-emitting device can output light having at least F1 fidelity according to the TM-30 standard for color rendering.

During operation, a luminaire containing the light-emitting device can output 200 or more lumens per Watt of input power.

The light conversion material can have multiple peak emission wavelengths between 580 nm to 650 nm.

The light-emitting device can include an encapsulant including the light conversion material, the encapsulant encapsulating the first LED die and the second LED die on a surface of a substrate. The light-emitting device can include at least a portion of an electrical circuit including the first LED die and the second LED die, the electrical circuit being configured to provide independent control of a first amount of power supplied to the first LED die and a second amount of power supplied to the second LED die.

$L_1$ can be in a range from 400 nm to 500 nm. $L_2$ can be in a range from 600 nm to 650 nm. Alternatively, $L_2$ can be in a range from 500 nm to 565 nm. $L_{P1}$ can be in a range from 500 nm to 550 nm. $L_{P2}$ can be in a range from 550 nm to 650 nm. $L_{P3}$ can be in a range from 580 nm to 650 nm.

In another aspect, the disclosure features a light emitting device package including a first light emitting device according to the first aspect, wherein the relative concentration of the first, second, and third phosphor compounds in the homogenous light conversion material, and the relative luminosity of the first and second LEDs are further selected so that the light emitting device, during operation, emits first white light having a first correlated color temperature (CCT), and a second light emitting device according to the first aspect, wherein the relative concentration of the first, second, and third phosphor compounds in the homogenous light conversion material, and the relative luminosity of the first and second LEDs are further selected so that the light emitting device, during operation, emits second white light having a second CCT. Amounts of the first and second white light can be mixed and separately controllable such that a CCT of the mixed light can be varied between the first CCT and the second CCT.

In general, in another aspect, the disclosure features a light-emitting device, including: a substrate; a first light-emitting diode (LED) die having a first spectral power distribution (SPD) and a second LED die having a second SPD different from the first SPD, the first LED die and the second LED die being supported by the substrate on a first side of the substrate, the first SPD having a primary peak wavelength or a dominant wavelength of 500 nm or more; and a phosphor material arranged to receive light emitted from the first LED die and second LED die, the phosphor material configured to convert light received from the first LED die as it passes through the phosphor material into light having a third SPD and pass light from the second LED die as it passes through the phosphor material into light having a fourth SPD. The third SPD is broader than the first SPD, the second SPD and the fourth SPD.

Examples of the light-emitting device can include one or more of the following features and/or features of other aspects. For example, the primary peak wavelength or the dominant wavelength of the first SPD can be 550 nm or more. The primary peak wavelength or the dominant wavelength of the first SPD can be 600 nm or more.

The light-emitting device can include an encapsulant including the phosphor material, the encapsulant encapsulating the first LED die and the second LED die on a surface of the substrate.

The fourth SPD can be broader than the first SPD. Alternatively, the first SPD and the fourth SPD can be identical.

A color of the primary peak wavelength or dominant wavelength of the first SPD can be red. A color of a primary peak wavelength or a dominant wavelength second SPD can be blue, cyan, or ultraviolet.

The light-emitting device can include one or more additional first LED dies having the first SPD and one or more additional second LED dies having the second SPD, the additional first LED dies and the additional second LED dies being supported by the substrate on the first side of the substrate. The substrate can extend along a length with width and a thickness less than the length, and the first LED dies and second LED dies are arranged at different locations along the length of the substrate. The length can be greater than one centimeter and the width is one centimeter or less.

In general, in another aspect, the disclosure features a luminaire, including: the light-emitting device of either of the prior aspects; and a solid optical assembly arranged with a first light entry surface facing the light-emitting device, the solid optical assembly being configured to receive light from the light-emitting device at the surface and output the light from one or more light exit surfaces.

The solid optical assembly can include two light exit surfaces each arranged to output the light into different emission lobes.

The light-emitting device can extend in a plane and the solid optical assembly includes multiple light entry surfaces including the first light entry surface, the multiple light entry surfaces being spaced apart from each other and facing the light-emitting device, the solid optical assembly being configured to received light from the light-emitting device at each of the light entry surfaces and output light from the one or more light exit surfaces.

The luminaire can include a heat sink including a channel shaped and sizes to receive the light-emitting device. The heat sink can be in thermal contact with the light-emitting device at a bottom surface of the light-emitting device opposite the LED dies.

In another aspect, the disclosure features a system, including: one or more luminaires according to the prior aspect; and an electronic control system in communication with the one or more luminaires via a network, the electronic control system being programmed to control a brightness and a color of light emitted by the one or more luminaires.

In general, in a further aspect, the disclosure features a light-emitting device, including: a first LED die having a peak emission wavelength $L_1$ in a range from 360 nm to 490 nm; a second LED die having a peak emission wavelength $L_2$ in a range from 600 nm to 650 nm; a light conversion material positioned to receive light emitted from the first LED die and the second LED die, the light conversion material including: (i) a first phosphor compound having a peak emission wavelength $L_{P1}$ in a range from 500 nm to 550 nm; (ii) a second phosphor compound having a peak emission wavelength $L_{P2}$ in a range from 550 nm to 650 nm; (iii) a third phosphor compound having a peak emission wavelength $L_{P3}$ in a range from 580 nm to 650 nm. The first phosphor compound, the second phosphor compound, and the third phosphor compound are homogenously distributed through the light conversion material, and the light emitting device is a packaged LED device and a relative concentration of the first, second, and third phosphor compounds in the light conversion material, and a relative luminosity of the first LED and second LED die are selected so that the light-emitting device, during operation, emits white light having a spectral power distribution satisfying a preference P1 and a fidelity F3 according to a TM-30 standard for color rendering.

In general, in another aspect, the disclosure features a light-emitting device, including: a first LED die having a peak emission wavelength $L_1$ in a blue or ultraviolet portion of the electromagnetic spectrum; a second LED die having a peak emission wavelength $L_2$ in a red portion of the electromagnetic spectrum; a light conversion material positioned to receive light emitted from the first LED die and the second LED die, the light conversion material including: (i) a first phosphor compound having a peak emission wavelength $L_{P1}$ in a green portion of the electromagnetic spectrum; (ii) a second phosphor compound having a peak emission wavelength $L_{P2}$ in an orange portion of the electromagnetic spectrum; (iii) a third phosphor compound having a peak emission wavelength $L_{P3}$ in a red portion of the electromagnetic spectrum. The first phosphor compound, the second phosphor compound, and the third phosphor compound are homogenously distributed through the light conversion material. The light-emitting device is a packaged LED device and a relative concentration of the first, second, and third phosphor compounds in the light conversion material, and a relative luminosity of the first LED die and the second LED die are selected so that the light-emitting device, during operation, emits white light having a spectral power distribution satisfying a preference P1 and a fidelity F3 according to a TM-30 standard for color rendering.

Examples of the light-emitting devices can include one or more of the following features and/or features of other aspects. For example, during operation, a luminaire containing the light-emitting devices can output light from having at least F2 fidelity according to the TM-30 standard for color rendering. During operation, the luminaire containing the light-emitting devices can output light from having at least F1 fidelity according to the TM-30 standard for color rendering.

During operation, a luminaire containing the light-emitting devices can output 200 or more lumens per Watt of input power.

The light conversion material can have multiple peak emission wavelengths between 580 nm to 650 nm.

The light-emitting device can include an encapsulant including the light conversion material, the encapsulant encapsulating the first LED die and the second LED die on a surface of a substrate. The light-emitting device can include an electrical circuit including the first LED die and the second LED die, the electrical circuit being configured to provide independent control of a first amount of power supplied to the first LED die and a second amount of power supplied to the second LED die.

In general, in yet a further aspect, the disclosure features a light-emitting device, including: a first LED having a peak emission wavelength $L_1$ in a range from 360 nm to 490 nm; a second LED having a peak emission wavelength $L_2$ in a range from 600 nm to 650 nm or in a range from 500 nm to 565 nm; a homogenous light conversion material positioned to receive light emitted from the first and second LEDs, the light conversion material including: (i) a first phosphor compound having a peak emission wavelength $L_{P1}$ in a range from 500 nm to 550 nm; (ii) a second phosphor compound having a peak emission wavelength $L_{P2}$ in a range from 550 nm to 650 nm; (iii) a third phosphor compound having a peak emission wavelength $L_{P3}$ in a range from 580 nm to 650 nm. The light emitting device is a packaged LED device and a relative concentration of the first, second, and third phosphor compounds in the homogenous light conversion material, and a relative luminosity of the first and second LEDs are selected to that the light emitting device, during operation, emits white light having a spectral power distribution satisfying a preference P1 and a fidelity F3 according to a TM-30 standard for color rendering.

In general, in yet a further aspect, the disclosure features a luminaire, including: a first optical module including a first heatsink, a first light emitting filament including a first plurality of light emitting diode (LED) dies and a first encapsulant, and a first optical assembly arranged to receive light emitted from the from the first light emitting filament, homogenize the light received from the first light emitting filament to form homogenized light, and direct the homogenized light from the first light emitting filament into a first light distribution in a first hemisphere; a second optical module including a second heatsink, a second light emitting filament including a second plurality of light emitting diode (LED) dies and a second encapsulant, and a second optical assembly arranged to receive light emitted from the from the second light emitting filament, homogenize the light received from the second light emitting filament to form homogenized light, and direct the homogenized light from the second light emitting filament into a second light distribution in a second hemisphere opposite the first hemisphere; a bus arranged between the first optical module and the second optical module; an electronic control module supported by the bus, the electronic control module being configured to receive electrical power from a power source external to the luminaire and to control the first light emitting filament and the second light emitting filament to control the light emitted from the first and second light emitting filaments. The first plurality of LED dies includes at least one blue LED die or ultraviolet LED die and at least one red LED die and the first encapsulant includes a first phosphor compound and a second phosphor compound.

Examples of the luminaire can include one or more of the following features and/or features of other aspects. For example, the first and second light distributions can have different shapes. The first light distribution can be composed of two lobes. The second light distribution can be composed of a single lobe.

The luminaire can include a cover including a first panel arranged on a first side of the luminaire and a second panel arranged on a second side of the luminaire opposite the first side, the first and second panels forming a first channel containing the first optical module and a second channel containing the second optical module. The first and second panels can include forged aluminum. The forged aluminum of the first and second panels can provide a reflective surface having a parabolic shape.

The luminaire can include a first sensor assembly arranged to receive light from the first optical module.

The luminaire can include a second sensor assembly arranged to receive light from the second optical module. The first optical assembly can include a plurality of light guides arranged to receive light from the first light emitting filament and guide the light to an extractor. The extractor can have a single extraction surface. The extractor can have a pair of extraction surfaces spaced apart from each other. The first optical assembly can include a plurality of injectors arranged to receive the light from the first light emitting filament and couple the light into a corresponding one of the plurality of light guides.

The first heat sink can include an indentation having a floor extending in a plane and side walls on opposing sides of the floor, wherein the light emitting filament is arranged in the groove in thermal contact with the heat sink at the floor and the side walls. The indentation can be a groove.

The first heat sink can include first panel housing the first light emitting filament and a second panel extending from the first panel adjacent the first optical assembly, the second panel having a surface contacting the first optical assembly at a location displaced from the first light emitting filament. The first heat sink can have a G-shaped cross-section.

In general, in a further aspect, the disclosure features a luminaire including: a heat sink having a surface including an indentation in a raised elevation relative to opposing side surfaces, the indentation having a floor and opposing side walls extending from the floor; and a light-emitting diode (LED) package including a substrate having a top and a bottom surface and the opposing side surfaces extending between the top and bottom surface, wherein the bottom surface of the LED package is in thermally conductive contact with the floor of the indentation and the opposing side surfaces of the LED package are in thermally conductive contact with the opposing side walls of the indentation.

Examples of the luminaire can include one or more of the following features and/or features of other aspects. For example, the bottom surface can be in direct contact with the floor of the indentation, and one or more of the side surfaces can be in direct contact with the side walls of the indentation, wherein the indentation is U-shaped.

The indentation can be a groove and the opposing side walls of the indentation are perpendicular to the floor of the indentation.

The LED package can be press fit into the indentation.

In general, in yet another aspect, the disclosure features a luminaire, including: a first part including a first optical aperture; a second part including a second optical aperture; and a clamp securing the first part to the second part with the first optical aperture abutting the second optical aperture such that the first and second optical apertures intersecting a path of light propagation in the luminaire, the clamp extending along a perimeter of the first and second parts and contacting the luminaire at multiple points exerting a force forcing the abutting optical apertures against each other, wherein the force is sufficient to hold together and maintain registration of the first and second parts during operation of the luminaire.

Examples of the luminaire can include one or more of the following features and/or features of other aspects. For example, the first port can include a light guide and the second part comprises an extractor, the light guide and the extractor being optically coupled at the abutting optical apertures, the light guide being configured to guide light along a forward direction and provide the guided light to the extractor at the abutting optical apertures, and the extractor is configured to direct light received at the abutting optical apertures and output the received light with a predetermined light distribution into an ambient environment.

Examples of the luminaire can include one or more of the following features and/or features of other aspects. For example, the clamp can include a hook arranged at a first end of the clamp and an arch arranged at a second end of the clamp opposite the first end, the hook being shaped to hook into the first part and the arch being shaped to press onto the second part. The first part of the light fixture can be a light guide or a housing. The second part can be an optical extractor.

The clamp can include one or more spring elements. The one or more spring elements can include undulating portions arranged to provide a resilient component to the force forcing the abutting the optical apertures against each other.

The clamp can be composed of a single piece of metal.

Particular implementations of the subject matter described in this specification can be implemented so as to realize one or more of the following advantages. The luminaire can provide a high dynamic range, vary the correlated color temperature (CCT), be easily replaced and upgraded on site, and operate at high optical efficiencies.

BRIEF DESCRIPTION OF THE DRAWINGS

FIG. 1A shows recommended specification criteria from IES TM-30 Annex E based on Design Intent and Priority Level based on further detailed parameters.

DETAILED DESCRIPTION

The disclosed concepts are directed, at least in part, toward networked, white-tunable luminaires and component light sources. The luminaires include an optical system with high optical efficiency, e.g., above 80% efficiency, uniform light properties, and effective beam shaping. Optical efficiency can be 80% or more such as 85%, 90%, 95% or even 96% or higher. Light properties such as brightness and color can be uniform in space upon output, on a target surface, or both. The luminaires can provide beam shaping to illuminate target surfaces with desired uniformity, brightness, color, white point, or a combination thereof. Illumination away from target surfaces can be minimal.

Luminaires

Figure 1B:
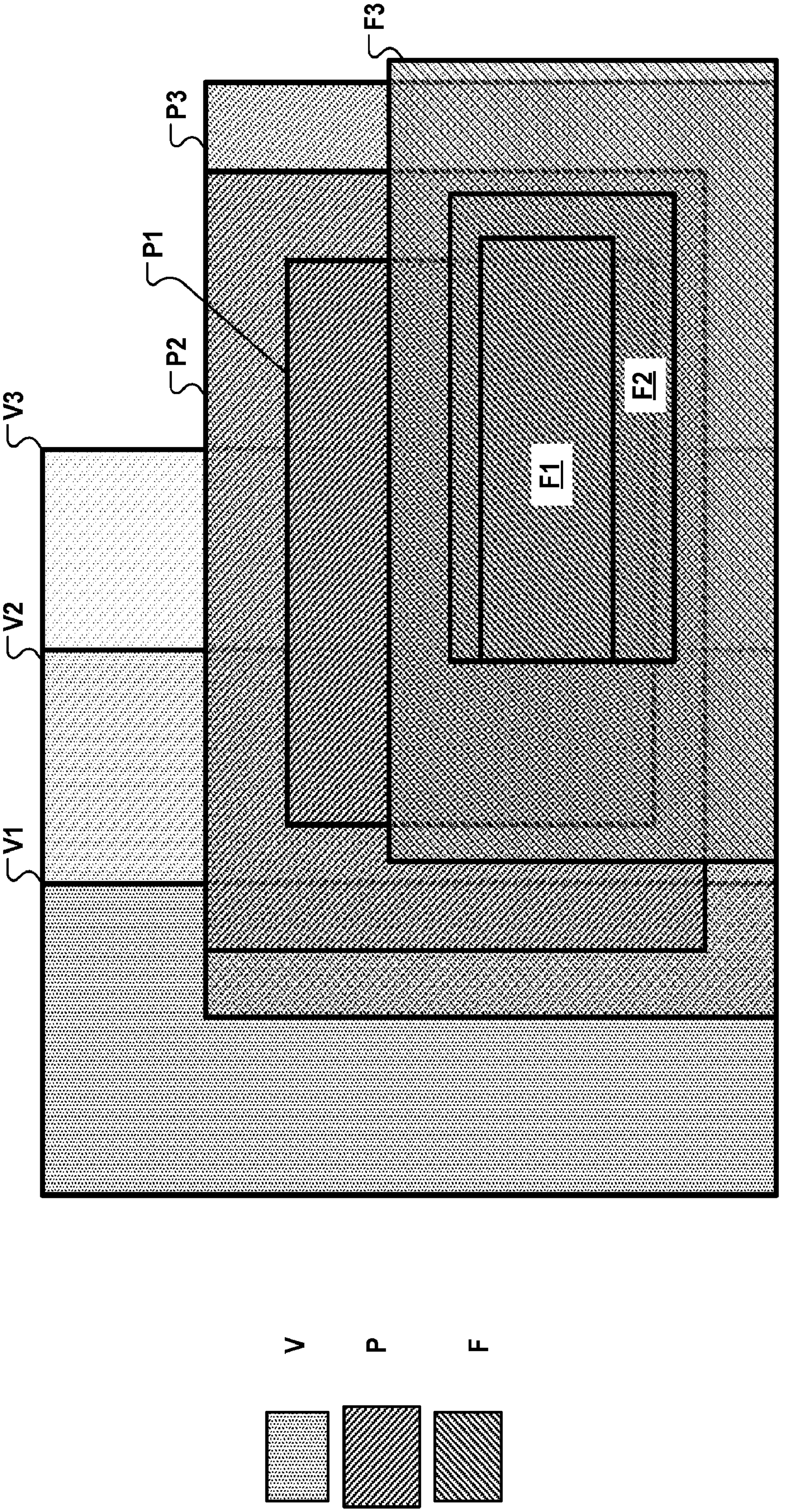
FIG. 1B shows a schematic representation of overlaps and possible combinations of TM-30 Design Intents and Priority Levels.
Figure 2A:
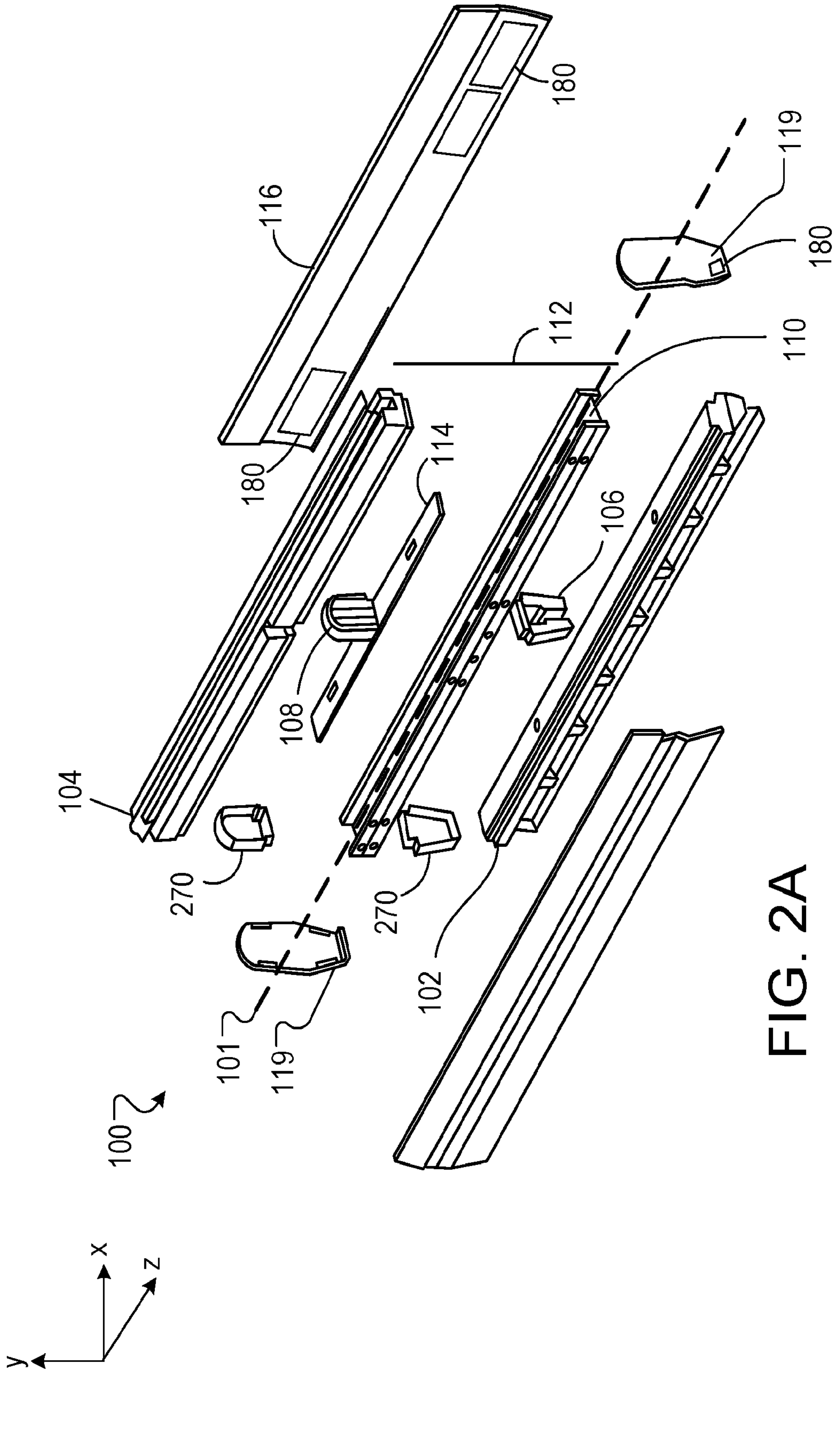
FIG. 2A shows an exploded view of a luminaire according to some examples.

FIG. 2A shows an exploded view of an example luminaire 100 configured for both direct and indirect illumination. The luminaire 100 includes optical modules 102 and 104 for providing direct and indirect illumination, respectively. The optical modules 102 and 104 are mounted on a shared bus 110 that also houses an electronic control module (ECM) 114. Luminaire 100 also includes upper and lower sensor towers 106 and 108, power lines 112, and a cover 116 composed of two panels which attach to bus 110 and enclose elements within the luminaire 100. Two brackets 119 enclose the ends of the luminaire 100 between the panels of the cover 116. The luminaire 100 extends linearly along an axis 101, which is parallel to the z-axis of a Cartesian coordinate system provided for reference. Other example luminaires may provide just direct illumination, or just indirect illumination. Different example luminaires may have different forms such as pendant, flush mount, recessed, wall mount, wall wash, grazer, standing and other forms, for example The direct and indirect optical modules 102 and 104 both include respective optics, LED boards, and heat sinks. Generally, the optics of optical modules 102 and 104 are similar except, in the present example, for optical extractors 130 and 126, which shape the extracted light for direct and indirect illumination. When appropriately installed, direct optical module 102 provides direct lighting on a target surface and can, e.g., be configured to maintain light distribution angles below a glare zone. The indirect optical module 104 provides indirect lighting by illuminating a target surface such as a ceiling, which in turn, reflects light into the ambient environment. The indirect optical module 104 in configured, in the present example, to create a uniform, tightly controlled light distribution composed to two lobes. The direct and indirect optical modules 102 and 104 operate in tandem to provide a desired ration of direct to indirect illumination, e.g., such that overall light output ratios of indirect/direct light are between 30%/70% and 70%/30%.

The direct and indirect optical modules 102 and 104 both include a solid-state light source, such as a light source that uses light-emitting diodes (LEDs) or other solid-state light emitters. The light source can be a LED package, e.g., a chip on board (COB) packaged LED device, or in another format, and can have point-like, filament or other geometries. The light source can provide high efficiency, low etendue, stability of brightness and chromaticity, and high color rendition.

As described in more detail below, the light source in each optical module 102 and 104 of the example luminaire 100 are matched and edge-coupled to the optics of each module, which include components such as coupling, guiding, and extracting components, or a combination thereof.

The lower and upper sensor towers 106 and 108 each house sensors to collect information about the surroundings of the luminaire 100. The ECM 114 can modify the output characteristics of the direct and/or indirect optical modules based on this information. Generally, the lower and upper sensor towers 106 and 108 can include, e.g., a passive infrared (PIR) occupancy sensor, e.g., that utilizes application-specific integrated circuits (ASIC) and an ambient light sensor that blocks infrared and/or ultraviolet radiation. Generally, the lower and upper sensor towers 106 and 108 can be the same or different. In some examples, the lower sensor tower 106 includes a flat lens resulting in a sleek shape, e.g., aesthetically pleasing, that can fit inside the luminaire 100. Alternatively, or additionally, the upper sensor tower 108 can include a digital color sensor for measuring a target's, e.g., a ceiling's, reflected light characteristics.

The ECM 114 includes an ECM board (e.g., a PCB), a microcontroller (MCU), and the integrated sensor towers. The ECM 114 can provide feedback of various ambient conditions including illumination conditions of target surfaces such as brightness, color, shading, amount of ambient light, occupancy, general ambient temperature or thermal imaging and acoustics, for example. The ECM 114 can interface with sensors coupled to light guides 122 from each optical module to determine color or other properties of internally mixed light. Such sensors can have high dynamic range. Consequently, the ECM 114 can regulate color temperature, irrespective of LED binning and aging. For example, the ECM 114 can receive data from the upper sensor tower regarding the reflected light characteristics of the target, which can allow the ECM 114 to offset any ceiling induced artifacts.

The cover 116 includes panels that cover opposing sides of the luminaire 100. In some examples, the panels are aluminum, e.g., forged aluminum, or other material having a highly reflective surface. The shape of the panels can vary depending on the implementation. In some examples, the panels have a parabolic shape.

Luminaire 100 includes clamps 270 which hold elements of the luminaire in place. More detail about the clamps 270 is provided below. Labels 180, e.g., with information about replacing parts of the luminaire, can be placed on the interior surfaces of cover 116.

The power lines 112 connect the luminaire to an external source of electrical power and can allow for high-efficiency (e.g., 80% or more, 90% or more, such as 93.1%) two-stage power conversion. In some implementations, the power lines are used in conjunction with gallium nitride (GaN) field-effect transistors (FETs) to reduce switching losses.

The direct and indirect optical modules 102 and 104 are constructed in a manner so they can be "dropped in" the bus 110, e.g., easily installed and replaced. The bus 110 can distribute input power to both the light sources and facilitate inter-board communication and arbitration.

Figure 2B:
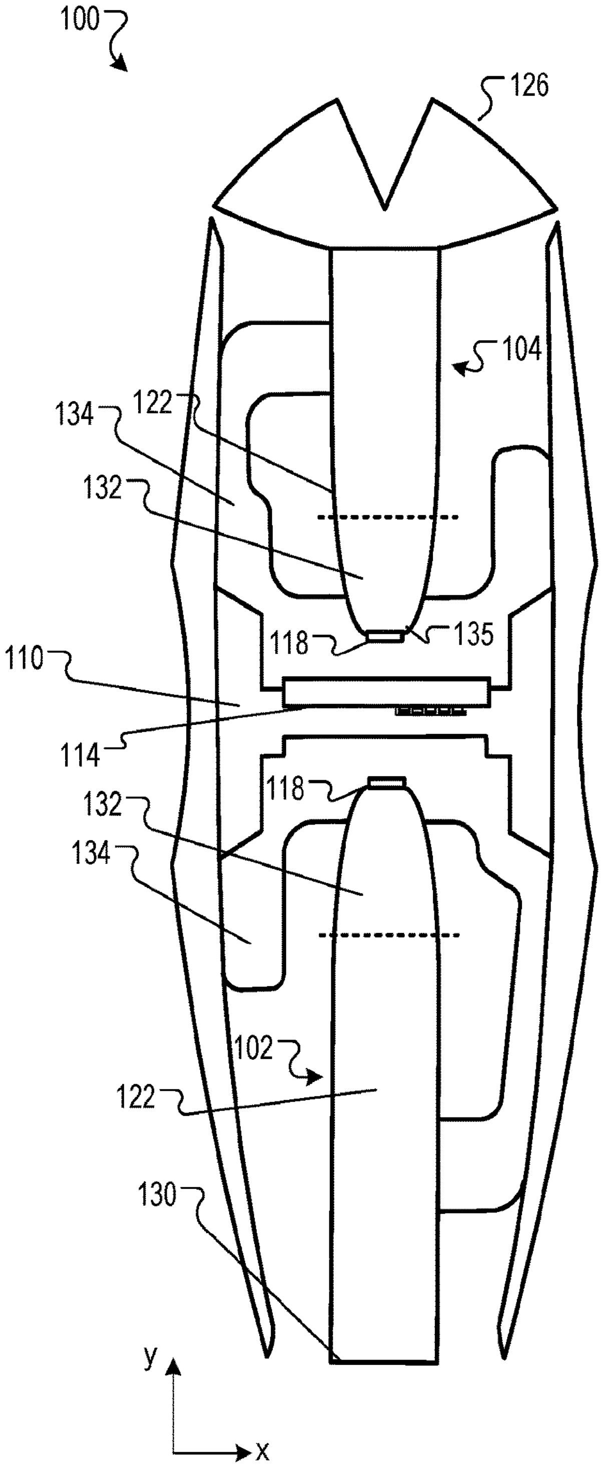
FIGS. 2B and 2C show sectional views of the luminaire of FIG. 2A.
Figure 2C:
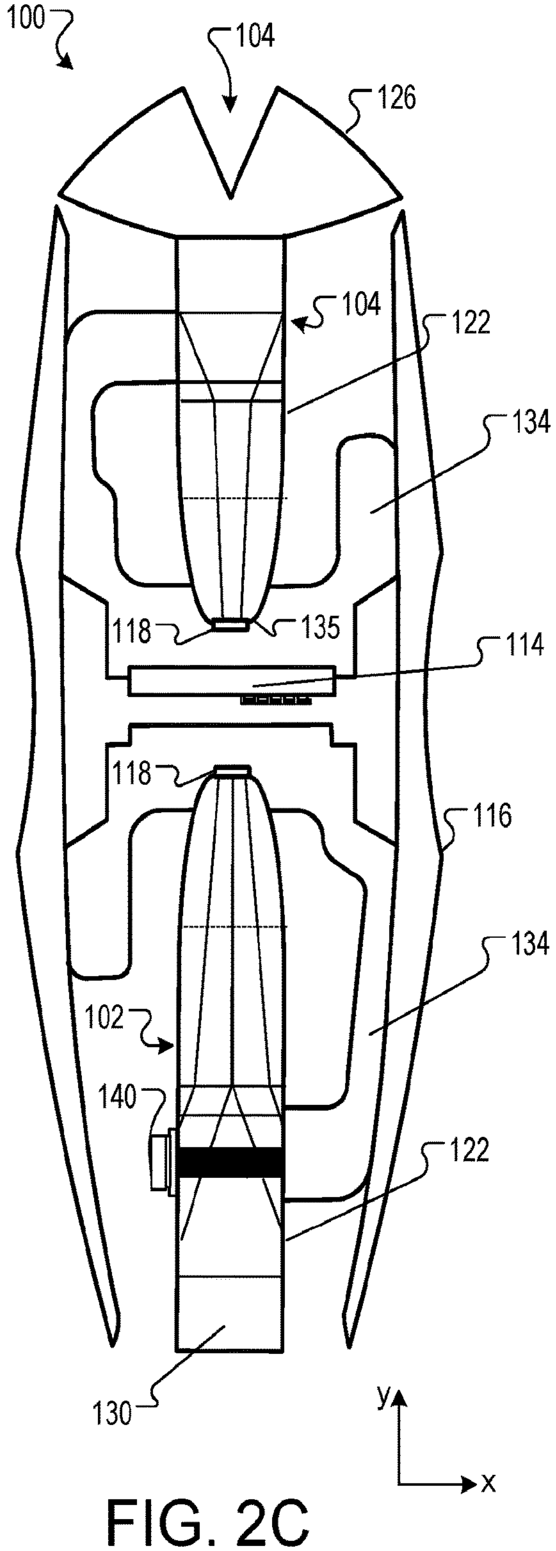

Referring also to FIGS. 2B and 2C, sectional views of example luminaire 100 through two sectional planes parallel to the x-y plane of the Cartesian coordinate system are shown. The figures show sections at different locations along axis 101, revealing different components.

The direct and indirect optical modules 102 and 104 each include a light source 118, a light guide 122, a CPC injector 132, and an extractor (126 for module 104 and 130 for module 102). The CPC injectors 132 are arranged to capture light emitted from the light sources 118 and couple the captured light into the corresponding light guide 122. In certain implementations, the CPC injectors 132 can capture nearly all light from the light source 118. For example, a good total internal reflection (TIR) CPC injector with a suitably shaped input aperture and immersion coupling (e.g., through an index matching gel) can capture 95% or more light emitted from the light source 118. Like coupling efficiencies can be achieved with a hollow CPC injector that is based on a reflective hull. Suitably configured injectors can preserve etendue and help provide high overall optical efficiency, e.g., 96%, of the luminaire 100. The CPC injector 132 also provides an initial shaping of light distribution. In certain examples, the initial shaping of light distribution is sufficient such that the luminaire 100 does not use an extractor for indirect lighting.

The light guides 122 receive light from the CPC injectors 132 and guide the light to the extractors 126 and 130. The light guides 122 also function as mixing chambers so that light emerges from the light guides uniform (intensity) and mixed (spectrally). In some implementations, the light guides 122 can provide shaping in lateral directions, axial directions, or both directions of the output light. Consequently, light emerging from the luminaire 100 can have a low unified glare rating (UGR rating), e.g., with little to no stray light trespass.

The size of the light guides 122 is generally selected to be compatible with the light sources 118. For example, in certain cases, the light guides 122 can be up to a few millimeters wider than the light source 118, and have a height of around 40 mm. Such dimensions can be long enough to provide sufficient distance for the light to fully mix while preserving etendue.

The light guides 122 are optically coupled to extractors 126 and 130 at abutting optical apertures. The light guides 122 guide light in a forward direction to the extractors 126 and 130, respectively, thereby providing light to the extractors 126 and 130 at the abutting optical apertures.

Extractor 126 and extractor 130 are shaped differently to provide different light extraction patterns for direct and indirect illumination. In this example, the extractor 126 has a batwing shape (in cross-section), which can sculpt the output light distribution in space precisely, e.g., produce light distributions with little to no glare and without additional baffles. The final distribution of the indirect light can vary greatly depending on the shape of the extractor 126. Additionally, the shape of extractor 126 can allow the luminaire 100 to accurately place light on a target surface, with little to no light trespass. Extractor 130 has a single extraction surface, which provides a single light lobe for direct illumination.

Each optical module also includes a heat sink 134 with a "G" shaped cross-section to surround parts of the optics of modules 102 and 104. The heat sink 134 interfaces directly with the cover 116 and bus 110 to provide a good thermal path from the respective light source to the ambient environment. Moreover, the top of the "G" contacts the light guide 122 and a channel 135 at the base of each "G" receives the light sources 118 and CPC injectors 132 for optical alignment and mounting. The heat sink 134 manages the temperature of the luminaire 100 during operation to maintain its temperature below a threshold, e.g., 60° C. or less, which can improve the optical efficiency of the luminaire 100, e.g., increased flux maintenance lifetime and chromaticity shift lifetimes. A fastener 140 can affix the optics to the heat sink 134.

Additionally, index matching gel is located between a CPC injector 132 and the light source 118. The index matching gel can reduce Fresnel losses at package-air and air-optic interfaces, which can improve efficacy and optical efficiencies.

Figure 3A:
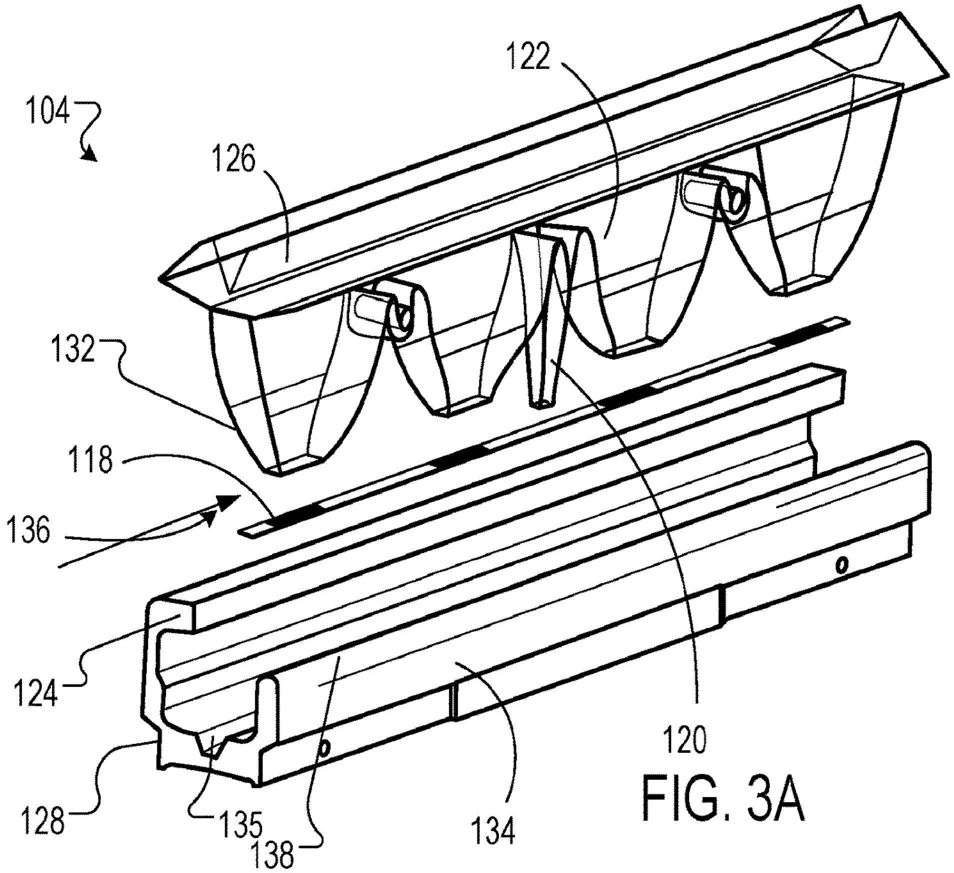
FIGS. 3A and 3B respectively show exploded and perspective views of the heat sink and light source of the luminaire of FIGS. 2A-2C.
Figure 3B:
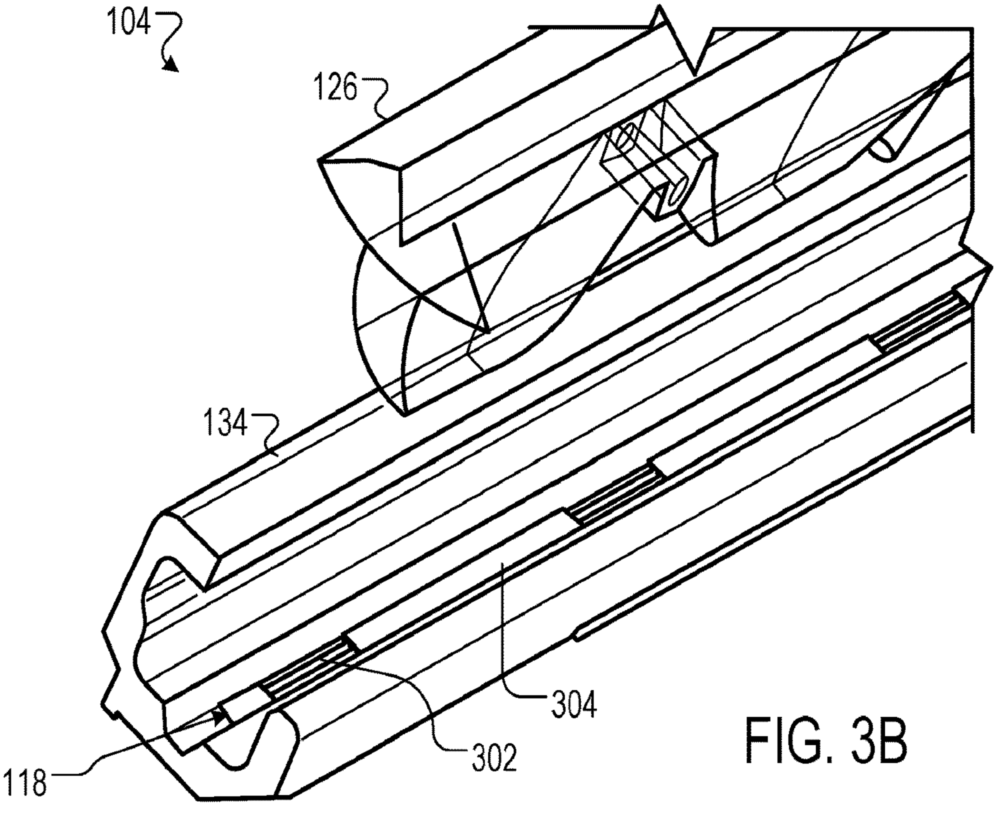

FIGS. 3A-3B show two exploded, perspective views of portions of the example luminaire 100 including optical module 104, heat sink 134 and light source 118. Here, the optics of the optical module are shown to be composed of a single extractor 126 that is fed by four light guides 122, each receiving light from a corresponding CPC injector 132. A light pipe 120 is located between the light guides 122. In this example, the light source 118 is in the form of a filament, e.g., a long, thin, LED package, but can have other geometries in other implementations. Generally, the filament can be rigid or flexible, depending on the implementation. In FIG. 3B, the light source 118 is shown positioned at the base of channel 135 in the heat sink 134.

Functionally, the light source 118 includes active regions 302 adjacent CPC injectors. The active regions 302 provide light during operation and are separated by inactive regions 304. The active regions 302 include multiple LED dies encapsulated by an encapsulant on a suitable substrate. The active regions 302 are spaced apart on the substrate forming the inactive regions in between. Substrates can include organic materials such as FP4, polyimide, metal such as aluminum, ceramic such as alumina, or other materials, for example. Generally, the encapsulant can cover both the active regions 302 and the inactive regions 304 or, alternatively, just cover the active regions 302. The encapsulant can include one or more phosphor compounds. Each phosphor compound can be homogeneously or otherwise distributed through the encapsulant.

Figure 3C:
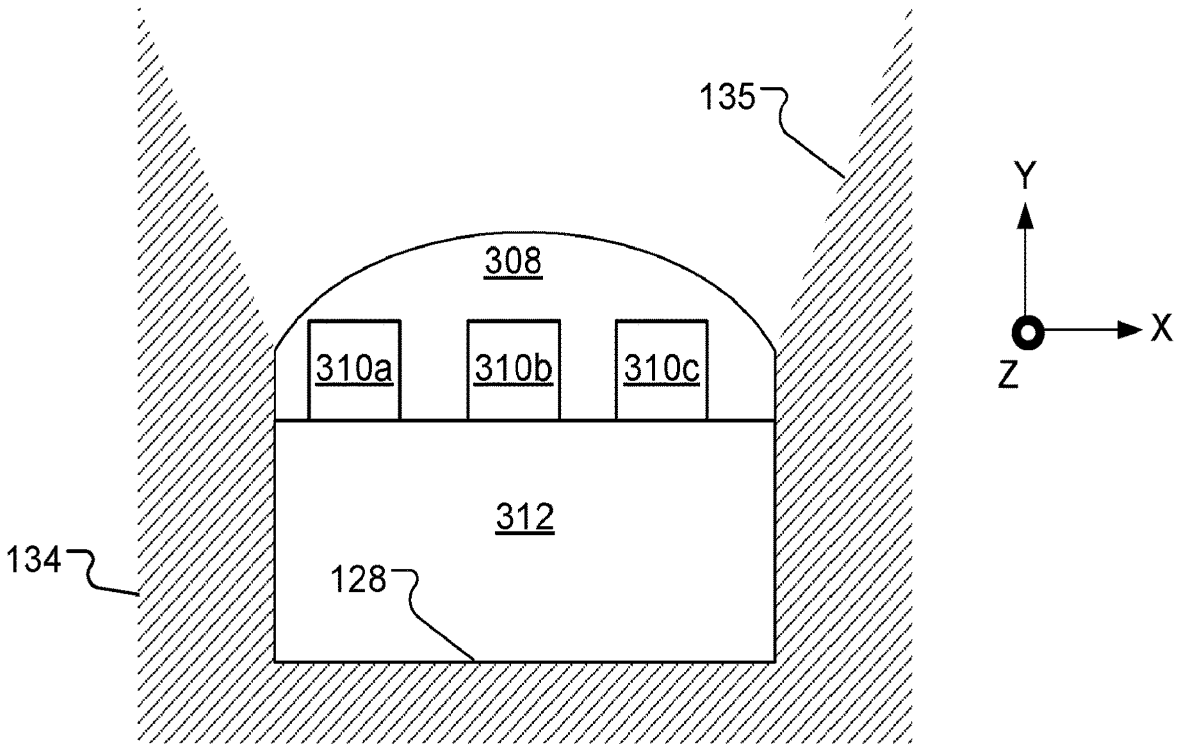
FIGS. 3C and 3D are cross-sectional schematic views of the light source in the example luminaire shown in FIGS. 2A-2C.
Figure 3D:
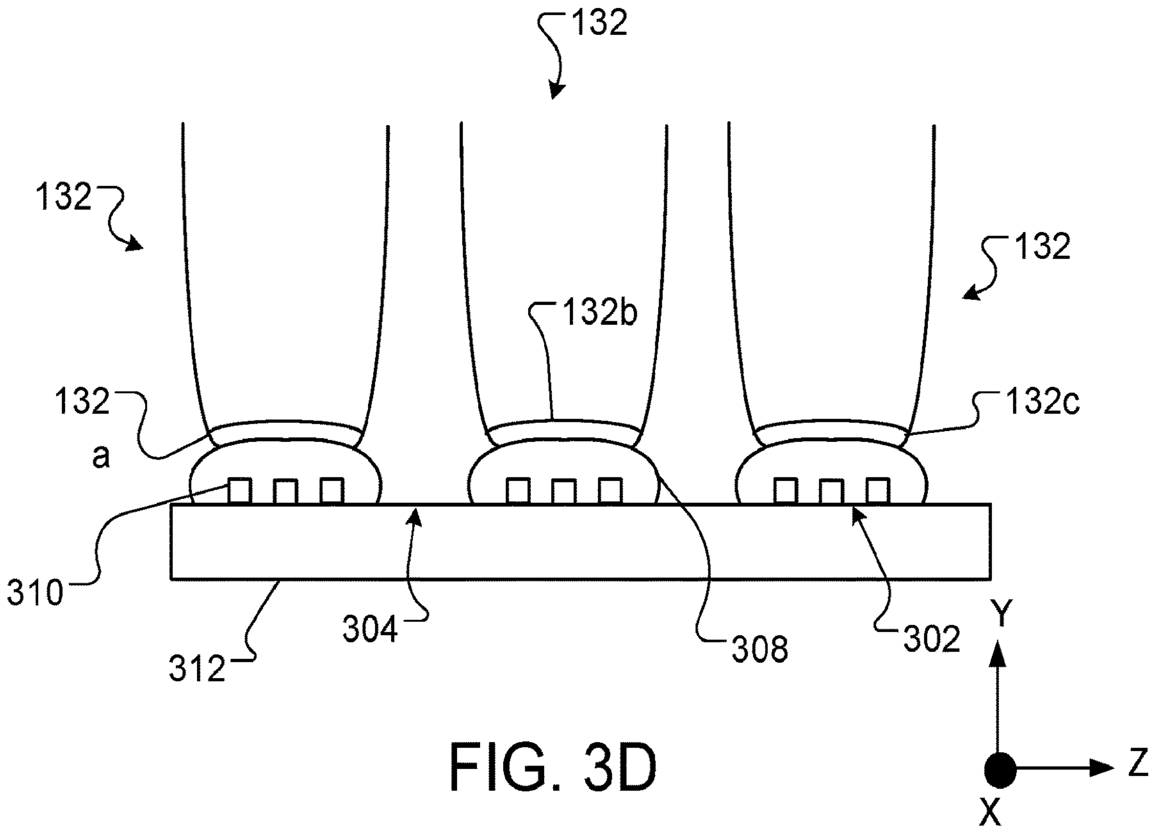

FIGS. 3C and 3D show cross-sectional views of portions of the example luminaire 100 including light source 118. FIG. 3C shows a section normal to the Z-axis and FIG. 3D shows a section normal to the X-axis. Light source 118 is composed of a substrate 312 that supports LED dies 310.

Depending on the implementation, the encapsulant may include only a broadband phosphor compound, one or more narrow band phosphor compounds, or both a broadband plus one or more narrowband phosphor compounds. The encapsulant of the example light source 118 includes a mixture of a broadband phosphor compound and a narrow band phosphor compound in a suitable binder (e.g., a silicone binder) that covers the LED dies 310 on the substrate. The broadband phosphor compound in this example is configured to provide light with a broad SPD distributed mostly between cyan to red. The narrow band phosphor in the instant example provides light with a narrow band SPD with one or more narrow peaks in the red portion of the visible spectrum.

In this example, the light source 118 includes three strips 310*a*, 310*b* and 310*c* of encapsulated LED die deposited on the substrate 312 in each active region 302. The strips 310*a*, 310*b* and 310*c* are separately operatively controllable. Each strip is configured to provide one or more control channels for its LED dies.

In this example, strips 310*a* and 310*c* are configured to provide warm white light, and strips 310*b* are configured to provide cool white light. Each strip includes one or more pump LED die configured to pump the phosphor in the encapsulant 308, and one or more direct red, direct green, direct cyan or other direct color LED dies that supplement respective colored light to the SPD provided by the phosphor-infused encapsulants. In this example, pump and direct color LEDs are arranged in a single row along the z-direction. Pump LED dies can be blue, ultraviolet, or other LEDs that can be used for pumping a phosphor.

In this example, each strip provides two channels so that the pump LED dies and the direct color LED dies in the strip are separately controllable. The light source 118 includes a suitable number of electrical connections to connect warm white and cool white strips to the ECM for separate control. Depending on the implementation, warm white strips in different active regions may be electrically combined or electrically separated to provide dependent or independent control, respectively. Cool white strips in an example light source may be similarly configured.

Depending on the example, the strips may be covered by an additional material over top of the encapsulant already present in each strip. Such additional material may include a transparent or translucent encapsulant or immersion material. Immersion materials may be oils or silicones intended to enhance optical coupling between the active regions and the injectors of the luminaire.

The walls of the heat sink 134 extend above the strips 310*a-c*. The bottom surface of the light source 118 and the floor 128 of the channel 135 are in thermally conductive contact. In this example, heat transfer can occur through the bottom of the light source 118 into the floor 128 of the heat sink 134. In addition, the opposing side surfaces of the substrate 312 are also in thermally conductive contact with the opposing side walls of the channel 135. Accordingly, heat conduction can occur via both the floor 128 of the heat sink 134 and the opposing side walls of the channel 135. FIG. 3D shows a series of alternating active regions 302 and inactive regions 304 on the substrate 312, the active regions 302 each coupling to a corresponding CPC injector 132. Each active region 302 includes the same strips and channels of LED dies 310. In this cross-section 301, only one strip within each active region is visible in the YZ plane. The LED dies 310 in each active region 302 are surrounded by the encapsulant of the respective strip. In this example, the encapsulant of strips between adjacent active regions is discontinuous. An immersion silicone oil 132*a*, 132*b* and 132*c* is arranged between the active regions 310 and the CPD injectors 132.

While the foregoing example includes specific combinations of LED dies and phosphors, in general, an active region 302 of a light source can include other color channels of LED dies, e.g., a red channel, a yellow channel, a green channel, and/or a blue channel. The LED package light source can include red, green, cyan, blue, ultraviolet LEDs, or any combination thereof. Furthermore, the LED package can include at least one phosphor in combination with suitable pump LEDs. The LED package may be configured as a single or multi-channel LED package. Multi-channel packages can be used to provide control over and/or stabilization of the chromaticity or white point of the light provided by the LED package by controlling individual amounts of light provided by each channel during operation. White point control for example may provide control of the light between a warm white (WW) and cool white (CW) light from the same package. For example, correlated color temperature (CCT) may be varied within an interval between 2200K and 5700K, or between 2500K and 5000K. An example light source whether offering one (single) or multiple channels can comprise one or multiple packages.

Furthermore, the shape and design of the heat sink 134 can reduce thermal resistance, enabling efficient heat transfer. For example, the heat sink 134 can be designed based on the shape of the light source, e.g., an elongate filament, which can improve thermal management and increase LED lifetimes.

The arrangement of the LEDs within the light source 118 can impact thermal crowding and thus thermal management. For example, a linear arrangement of LED dies can reduce thermal crowding. The package dimensions of the package being approximately those of the LED dies can also improve thermal management.

Light Source Color

In general, the light sources in luminaire 100 can be configured as a single or multi-channel LED package to provide control, stabilization, or both to properties such as the chromaticity or white point of the light provided by the light source 118. In some implementations, white point control can provide control of the color of light between a warm white (WW) and cool white (CW) light from same package. For example, correlated color temperature (CCT) may be varied within an interval between 2500K and 5000K. A light source according to the present technology can be configured to offer single or multiple channels and be arranged into one or multiple packages. The light source may include a WW, a CW or both a WW and a CW emitter combined with one or more direct red emitting LEDs.

LEDs within the light source can have one or more spectral power distributions (SPD). An SPD provides a profile of the power of light distributed throughout the spectrum and is typically given as a function of wavelength. The SPD of a light source determines chromaticity and for white light sources the correlated color temperature (CCT), also referred to as the white point, of the light source.

Generally, the light source includes at least one phosphor with at least one pump LED die. Phosphors emit light when exposed to certain types of radiation, e.g., exhibit luminescence. A pump LED die illuminates the phosphor to provide a desired SPD. In certain examples, the light source 118 includes two different LED dies with different SPDs that each illuminate the phosphor. As light from the LED dies propagates through the phosphor, the phosphor absorbs the pump light and emits light at longer wavelengths than the pump light. The phosphor can broaden and/or shift a peak wavelength of SPDs when comparing output versus input light.

In some implementations, light source 118 includes one or more first LEDs dies intended for pumping a phosphor, and one or more second LED dies, e.g., a red, green or cyan LED. The first LED dies can be blue, cyan, or ultraviolet pump LED dies, e.g., having light in a wavelength range from 360 nm to 490 nm, and the second LED dies can be red or cyan LED dies with a primary peak wavelength or dominant wavelength of 500 nm or more, e.g., 550 nm or 600 nm if intended as a red fill. In this disclosure, the color of the light refers to a spectral quality of light, even though the light might not be visible to the human eye, e.g., light with a wavelength of 360 nm to 400 nm is considered to be ultraviolet in color.

The dominant wavelength can be determined according to industry standards (see, e.g., https://www.ies.org/definitions/dominant-wavelength-of-a-color-stimulus/).

Both the first and second LED dies emit light that enters the encapsulant proximate to the LED dies, e.g., a binder containing phosphor compounds coating on top or over top of the LED dies. An inner surface of the encapsulant 308 receives light from the first and second LEDs. As light passes from the inner surface to an outer surface of the encapsulant 308, inelastic scattering of the light from the phosphor(s) changes the SPDs of the light from the LED dies. For example, the first SPD can become a third SPD, and the second SPD can become a fourth SPD. The third SPD can be broader, e.g., the FWHM of the primary peak in the SPD can be greater, than the fourth SPD. The fourth SPD can be broader than the second SPD, e.g., the phosphor in encapsulant 308 can broaden the spectrum of the light emitted by the LEDs.

In some implementations, the phosphor has wavelength dependent properties, e.g., the phosphor can broaden SPDs with some peak wavelengths and not affect SPDs with other wavelengths. For example, the second SPD can be unaffected from traveling through the encapsulant 308, e.g., the second and fourth SPDs are identical.

As another example, there can be multiple types of phosphor compounds within the encapsulant 308. The first LED dies can have a blue or shorter peak emission wavelength $L_1$, e.g., in a range from 360 nm to 490 nm. The second LED dies can have a red, orange, yellow, or green peak emission wavelength $L_2$, e.g., in a range from 600 nm to 650 nm or from 500 nm to 565 nm. The phosphor 308 can be a homogenous combination of three phosphor compounds with three different peak emission wavelengths LP, e.g., $L_{P1}$ can be green, e.g., 500 nm to 550 nm. $L_{P2}$ can be orange, e.g., 550 nm to 650 nm. $L_{P3}$ can be red, e.g., 580 nm to 650 nm.

White light from phosphor converted LEDs often lacks sufficient red light to achieve TM-30 specifications, specifically achieve high TM-30 Preference and Fidelity ratings. Incorporating a phosphor that scatters direct emissions from a red LED die can improve color uniformity over an angular spread and result in a tunable amount of red light in white light. This tunable red version of narrow band red can result in an increased chromaticity range and higher Preference ratings for low CCT and higher Fidelity ratings and efficiencies.

The relative concentration of the three phosphor compounds and the luminosity of the first and second LED dies can be chosen such that the luminaire 100 emits white light having certain qualities e.g., a preference P1 and a fidelity F3 according to the TM-30 standard for color rendering. In some implementations, the luminaire 100 can output light from an outer surface having a fidelity F1 or F2 according to the TM-30 standard for color rendering or higher. The luminaire 100 can have an efficacy of 200 lm/W (lumens per watt).

In some implementations, the phosphors in encapsulant 308 can have multiple red peak emission wavelengths, e.g., multiple values of $L_{P3}$ in the range of 580 nm to 650 nm.

In some implementations, electrical connections, subcomponents of the ECM 114, can control the amount of power supplied to each LED in the light source 118, e.g., to the LED dies. For example, the ECM 114 can supply a first amount of power to the first LED dies and a second (different) amount of power to the second LED dies.

The use of phosphor-converted LED emitters can help reduce an amount of color shift, e.g., $D_{uv}$; over time. For example, LEDs used alone can shift in their chromaticity over time. However, color compensation methods with various LEDs can reduce an amount of color shift.

The light source 118 includes one or more suitable color light sources such as direct color emitting LEDs, for example red, cyan, other color combined with a WW, a CW or both a WW and a CW emitter. Here, WW and CW emitters can include phosphor-converted LED emitters with a first channel for pump LEDs but can be other forms of white light emitters. The resulting light source can then include a one or more channels corresponding with their number of white light sources and a respective number of further channels for the direct color (red, cyan or other color) emitting LED(s).

In some implementations, the light source 118 is a phosphor-converted LED emitter, which has a first channel for pump LEDs and second channel for the direct red emitting LED(s). Supplementing light in the red portion of the spectrum with a narrow band source can be used to improve color rendering, stabilize color point, increase luminous efficacy, or a combination thereof. Suitable phosphors may be needed when supplementing the red portion of the spectrum. For example, a TriGain™ phosphor (from GE Current, Beachwood, OH), Nichia's H5 and F1 families (from Nichia Corp., Tokushima, JP), or other products may be employed.

Example efficacies can be 180 m/W or higher and may be as high as 215 lm/W or higher while achieving CCT values of 2700K to 5000K and TM-30 P1, F3 requirements for color rendering. Example LED packages may be configured as a highly elongate format of 1 mm×18 mm with all LED die in a single line under a common phosphor. The LED package may be configured as a surface mount package intended for recessed installation for reduced package level thermal resistance. The recessed installation increases the surface area for conductive heat transfer and improves heat spreading. Simulations have indicated that package thermal resistance can be reduced by 60-70% compared to standard 3030 LED packages.

Using mid power LED die designed for nominal operation at 65 mA, while limiting current during operation to 30 mA or other suitably underdriven LED die, can be an efficient design choice. The thermal management design is expected to allow operating temperatures of 60° C. or lower. The increased efficiency achieved by using a lower drive current can mitigate thermal droop associated with high temperatures, allowing packages to operate at 98-99% of 25° C., 65 mA efficacies for WW and CW respectively.

The use of suitable LED die, encapsulants, phosphors and package materials in the example LED package can achieve high lumen maintenance and chromaticity stability, for example L90 greater than 80000 hours and CS4 (chromaticity shift greater than four steps per TM-35) greater than 25000 hours. The example LED package provides low thermal resistance, resulting in a low LED operating temperature and can be configured to operate the LED die at below nominal current density. These aspects further improve lumen maintenance and chromaticity stability.

Figure 4C:
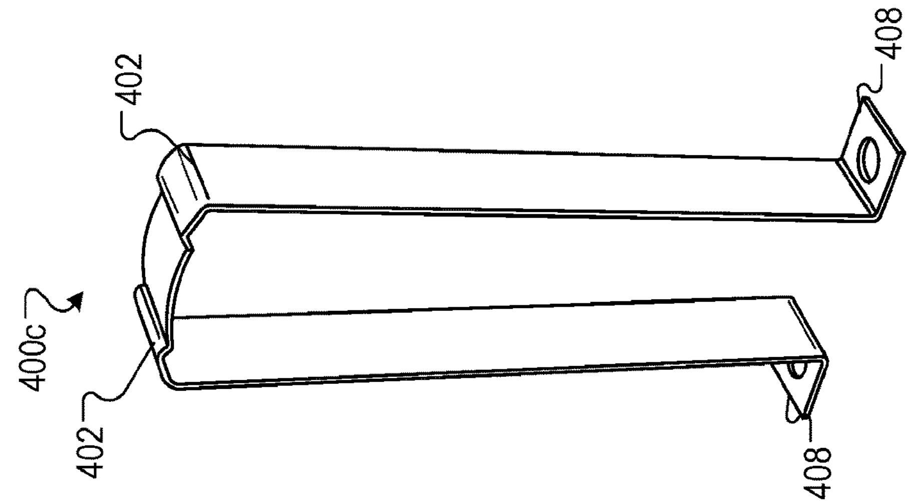
FIGS. 4A-4C depict perspective views of examples of clamps for securing multiple parts of a luminaire.
Figure 4B:
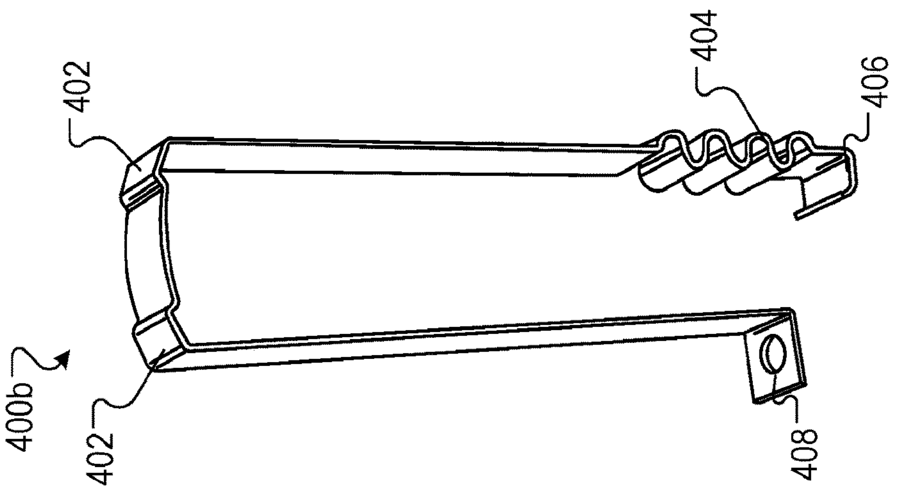
Figure 4A:
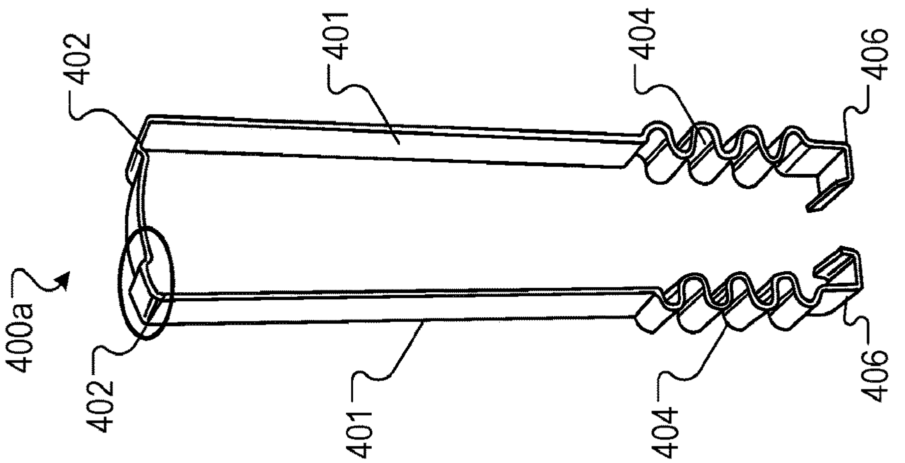

As noted previously, luminaire 100 includes clamps 270 that are mechanical elements shaped to secure various components of the luminaire together. FIGS. 4A-4C depict perspective views of examples of such clamps. In particular, these figures show example clamps 400*a*, 400*b*, and 400*c*, which are all examples of clamps for affixing the optics of indirect optical module 104 to the luminaire 100.

Each clamp 400*a*, 400*b*, and 400*c* is configured to secure different elements together without using an adhesive to bond the elements. The clamps are also shaped to register to alignment features (e.g., including grooves that register to ridges, posts that register to holes, etc) on one or more elements (e.g., optical elements) to facilitate accurate alignment of components of the luminaire relative to each other.

Clamp 400*a* includes a pair of arms 401 that extend along opposing sides of the optic of optical module 104. Each arm 401 includes a spring 404 composed of a corrugated portion of the arm. The arms 401 both terminate with hooks 406, which hook onto the heat sink of the optical module 104. The springs 404 allow the arms 401 to extend while assembling the luminaire 100 and provide a retaining force once assembled. The integral spring features 404 can provide a resilient component to the force holding the abutting optical apertures against each other.

The arms 401 are linked together at the end opposite the hooks 406 by a bridge that includes arches 402 designed to conform to the surfaces of the optic.

Connectors other than hooks can also be used. For example, clamps 400*b* and 400*c* are configured to be attached to the luminaire using an alternative fastener, such as a screw or a bolt. In particular, clamp 400*b* includes a through hole 408 at the end of one of its arms, which can receive a fastening element. Clamp 400*c* includes through holes 408 at the end of both arms for receiving fastening elements.

The clamps 400 can secure multiple parts of the luminaire 100 relative to each other. For example, the clamp 400 can hold a light guide, e.g., light guide 122, and the extractor 126, each of which can have an abutting optical apertures intersecting a path of light propagation in the luminaire 100. The clamp 400 can extend along the perimeter of the light guide 122 and the extractor 126 with multiple points of contact. At the points of contact, the clamp 400 can exert a force that forces the abutting optical apertures against each other to maintain registration of the multiple parts of the luminaire 100 during operation.

In general, it is believed that use of clamps, such as clamps 400*a*, 400*b*, and 400*c*, can reduce the amount of adhesive bonding of two or more different components to assemble the luminaire 100. Clamps can also facilitate easier disassembly of the luminaire compared to similar structures that use extensive adhesive bonding.

While luminaire 100 described above is a linear fixture, i.e., the luminaire extends along straight axis 101, other configurations are possible. For example, the luminaire can be curved, e.g., shaped like a closed loop, wavy, or otherwise shaped. Furthermore, in some examples, only a single optical module is used, e.g., to provide only indirect lighting or only direct lighting.

Hybrid Red Light Source

It is believed that conventional white LED light sources (e.g., composed of a phosphor pumped with a blue LED die) are deficient in red. Various approaches to add red light include using a broadband red phosphor, a narrowband red phosphor (e.g., TriGain™), or using a separately packaged red LED. However, such approaches, while providing relatively high CRI ratings (e.g., as high as 90 or 95), may not easily provide desired TM-30 Preference ratings.

Figure 5A:
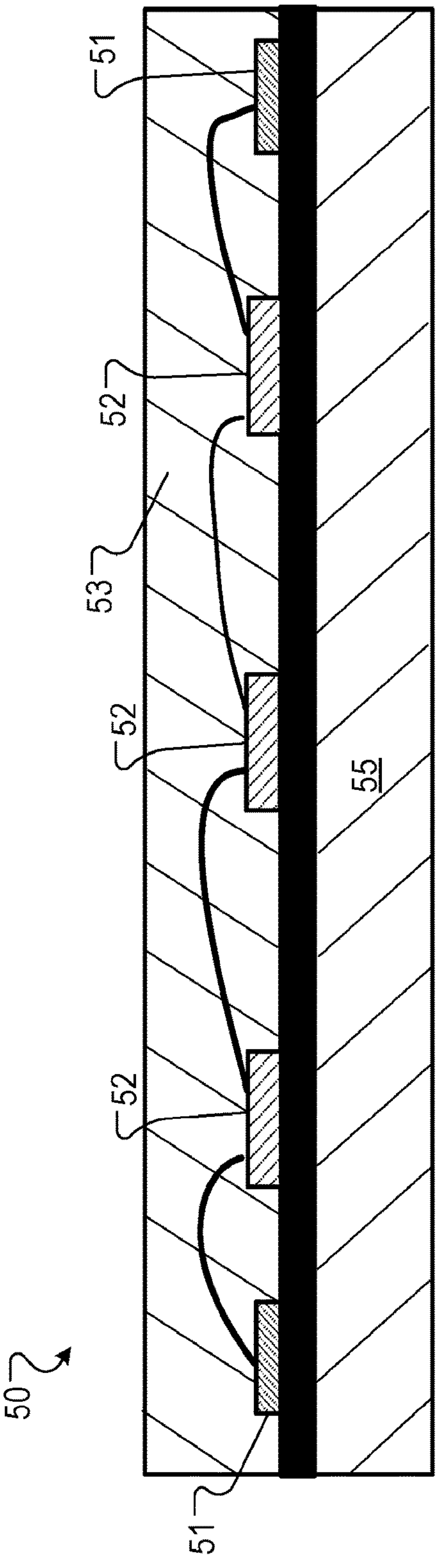
FIG. 5A is a cross-sectional schematic view of a portion of a hybrid red light source.
Figure 5B:
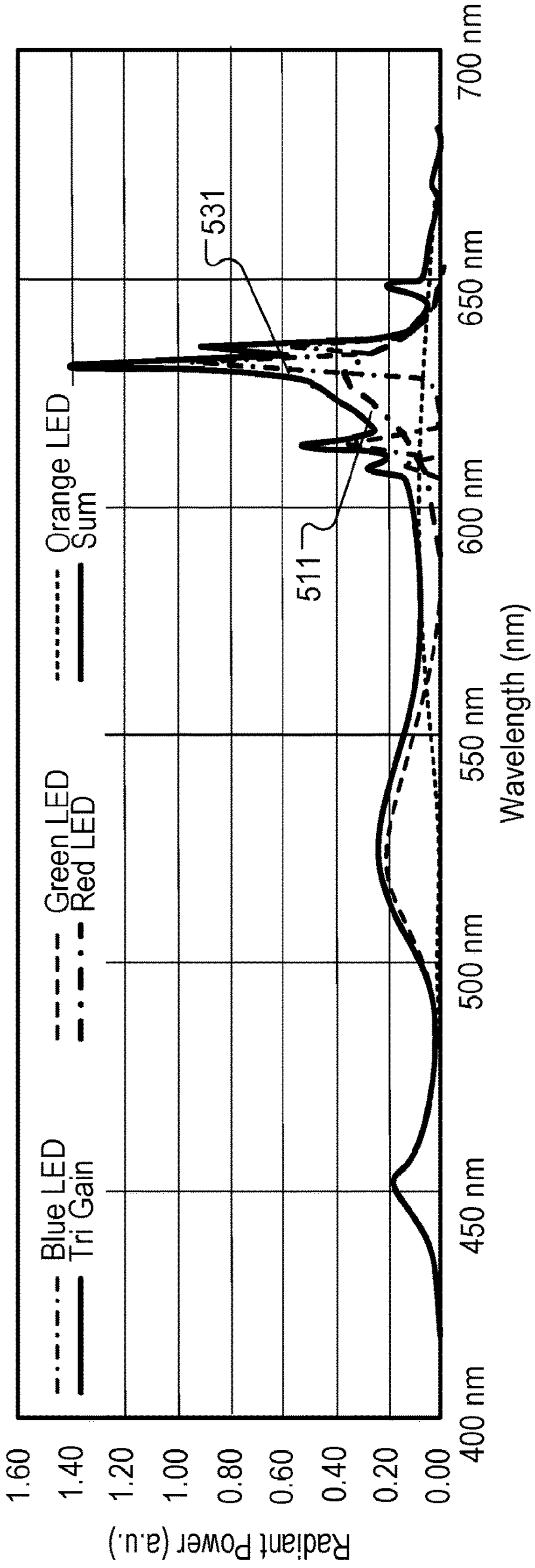
FIG. 5B is a plot showing spectral power distributions for different emitters and phosphors that can be incorporated in a hybrid red light source.

An alternative approach is to use a hybrid red light source, which can be achieved by packaging direct red emitting LED dies with blue LED dies and a phosphor or phosphors (e.g., TriGain™). An example hybrid red light source 50 is depicted schematically in FIG. 5A. Light source 50 includes red LED dies 51 and blue LED dies 52 all encapsulated by an encapsulant that includes one or more phosphor compounds (e.g., including TriGain™ phosphor) on a substrate 55. Although light source 50 is depicted as having three blue LED dies 52 and two red LED dies 51, more generally, these numbers can vary. Generally, such a light source can include the same number of red and blue LED dies, more red than blue, or more blue than red. Generally, the number of each die can be selected based on the type of die and the overall output specified for the light source.

It is believed that such a light source can feature several advantages. For example, the inclusion of the red LED dies allows the light source to adjust the amount of red light in the light source's SPD independent of the other colors. The independent red control also enables a reduction in the effect of any wavelength shift that can occur in a separately packaged red LED. Further, encapsulation of the red LED die in the phosphor can facilitate improvements in color uniformity due to scattering of the red light by phosphor particles as it traverses the encapsulant.

Figure 5C:
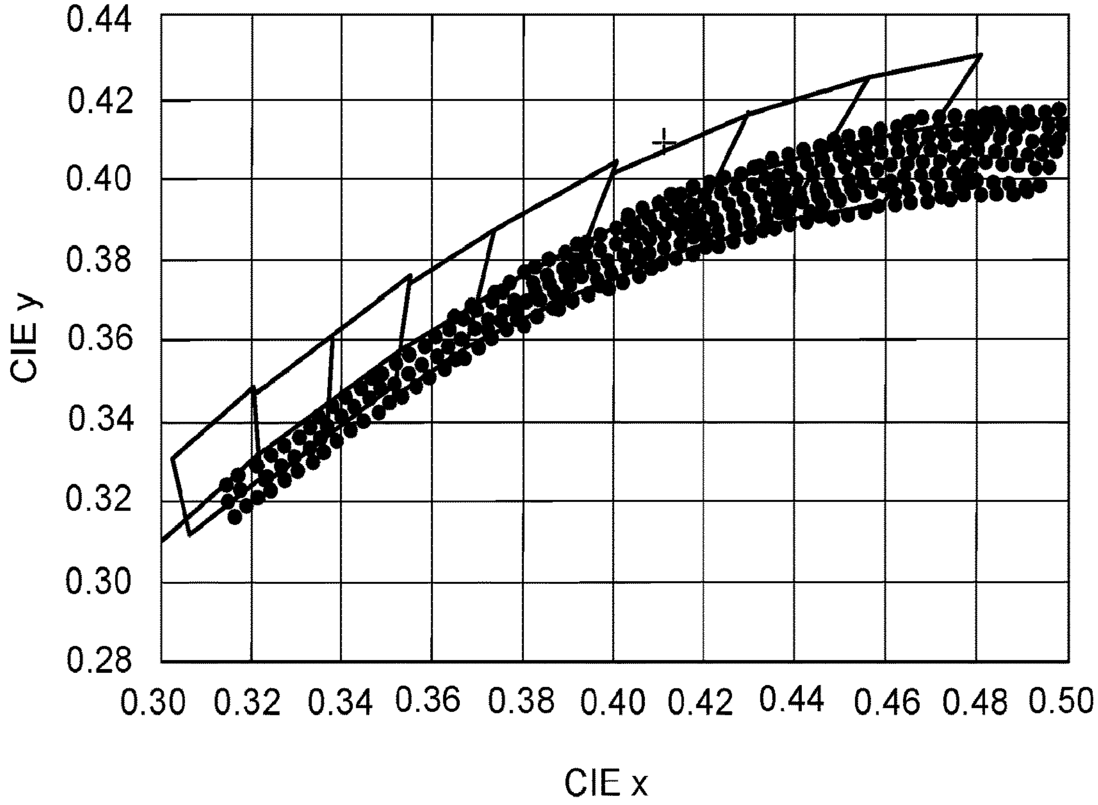
FIG. 5C is a plot showing an example chromaticity gamut used to evaluate different combinations of light emitters and phosphors in a hybrid red light source.

Referring to FIG. 5C, the SPD of an example hybrid red light source is shown. Also shown in this plot are the SPD of the blue LED, the red LED (511), and a green, orange, and TriGain™ phosphor (531). In this example, the red LED's SPD has an emission peak (at approx. 620 nm to 630 nm) that overlaps with the primary peak of the TriGain™ phosphor. The spectra shown in this example correspond to those obtained by deconvoluting spectra of Nichia's H5, F1, and red products and the SPD of the example light source is approximated by the sum of the constituent SPD's.

Using the approach to approximating a SPD of a hybrid red light source, it is possible to evaluate different hybrid red spectra for TM-30 and/or CIE color values. Referring to FIG. 5C, CIE x, y values for a large number of different SPD achievable by hybrid red light sources is plotted. For each data point, the mix of the relative amount of blue LED light, red LED light, and phosphor emission, is selected using a Monte Carlo algorithm. The data points show the range of samples evaluated. In this example, the samples are bound between CCTs of 2200K and 6500K and Duv from −0.007 to 0.001. However, more generally, the entire gamut or other regions of the gamut can be sampled this way.

Figure 5D:
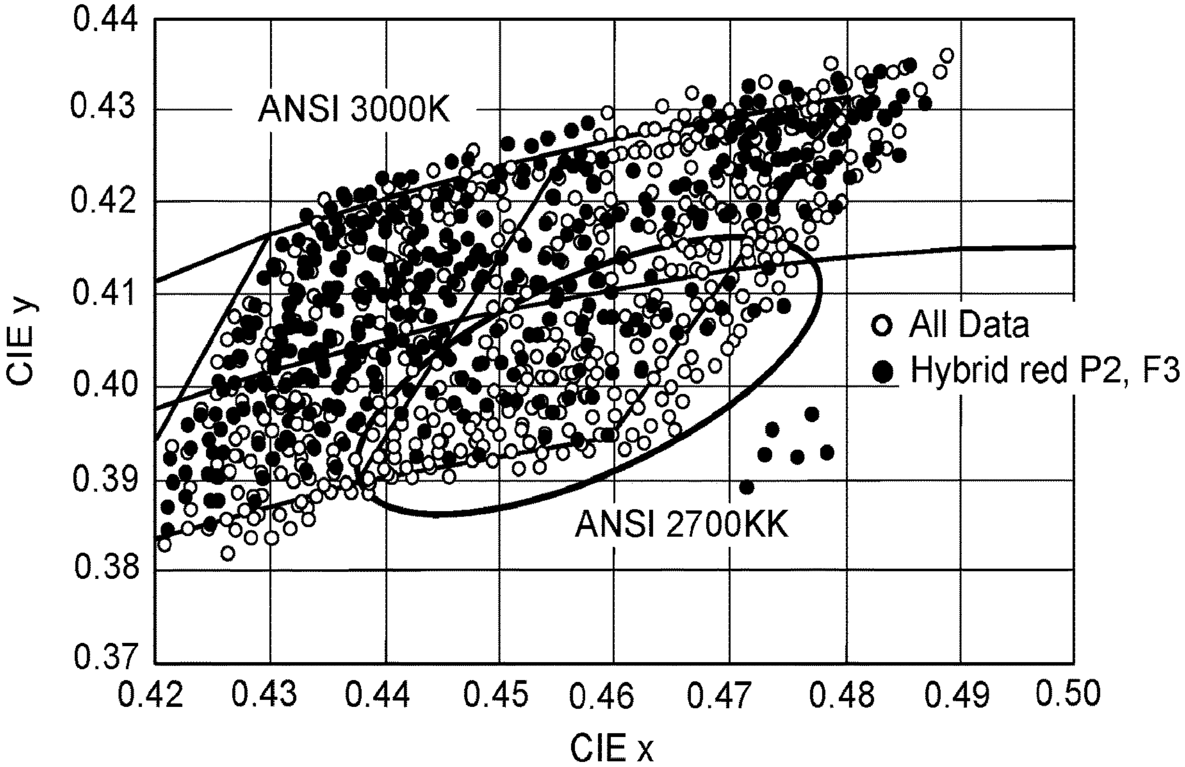
FIG. 5D is a plot showing an example chromaticity range achievable at low CCTs using hybrid red light sources.

It is believed that the hybrid red approach can reliably provide light sources that exceed the P2, F3 criteria, especially at cooler CCTs. Referring to FIG. 5D, the simulation data demonstrates that over 93% of samples with CCTs from 2700K to 3000K achieve P1 performance. In contrast, similar simulation experiments performed using the spectra for a light source without the additional red LED revealed that only 80% of the samples satisfied the P1 criteria. Accordingly, it can be concluded that a hybrid red light source can facilitate reliable achievement of P1 by a light source at low CCT.

Luminaire Efficacy

Per DoE Report 2019 Lighting R&D Opportunities (§ 3.4) luminaire efficacy is defined as: Luminaire Efficacy=Package Efficacy×Deratings (Droop, Power supply, Optical efficiency).

The light source 118 can be a hybrid of a phosphor converted white LED mixed with a direct color LED, for example a red, orange, yellow, green or cyan LED. The following description focuses on an example with a direct red LED. An elongate phosphor-encapsulated surface-mounted device (SMD) package can have blue and red emitting die along with broad band green, orange, and narrow-band red phosphors. Direct red-emitting die offer supplemental narrow band red emissions at wavelengths allowing warm white package efficacies up to 215 lm/W and color rendition P1, F3.

The ECM 114 can drive the LED die at current densities ~30% of the die design. The heat sink 134 provides the luminaire 100 with a thermal management system, so with low thermal resistance packages LEDs operate at $T_{case}$≤60° C. Total Droop is 0.96.

High-efficiency (gallium nitride) GaN (field effect transistors) FETs can be used in various power stages including the power supply, and can be over 95%, 96%, or 97% efficient. Resulting power Efficiency is 0.96×0.97=0.92.

Optical Efficiency (OE) may be ≥96% as noted. Capturing 2π solid angle source emissions with low-angle reflectors and immersion coupling by index-matching gels, from the photon's LED exit to the ambient environment there is only one index of refraction changing interface. Removing optical interfaces removes Fresnel losses at about 4% per interface. LED driver ICs available in the market may have 97% internal efficiency, for example, certain ICs from manufacturers like Transphorm (Goleta, CA) or Onsemi (Phoenix, AZ). Resulting power Efficiency can be over 90%, for example 0.96×0.97=0.92.

Luminous Flux Output

In general, the luminous flux output of the luminaires will vary depending on the size of the luminaire 100 and other factors, e.g., operating power, number of LED dies, etc. The example luminaire of FIGS. 2A-2C can be 2 inches by 5 inches by 4 feet and provide 3600 lumens or more. Light is emitted from both the top and the bottom of the luminaire 100. The output from the top of the luminaire is emitted, e.g., in a 140° batwing distribution to both mitigate glare and provide a soft indirect light to complement the direct component emitted from the bottom of the fixture. Other distributions of the indirect illumination output are possible, e.g., by appropriate design of extractor 126.

The control system can be configured to allow adjustment of the ratio of direct to indirect light over the range of 30:70 to 70:30 allowing for a more pleasing illumination experience and a significant glare reduction—a universal glare rating (UGR) of 18 or less depending on the selected ratio. The optical design can provide a sharp cut-off to eliminate angles that contribute to glare. Example uplight designs may provide a uniform luminance on a plenum/ceiling plane with a 4:1 or better gradient across a 10 foot plane.

The direct and indirect modules 102 and 104 can include one or more color sensors. For example, two color sensors can be used to monitor the chromaticity/CCT of both the direct and indirect light emissions. Optionally, a third color sensor, e.g., a color sensor in upper sensor tower 108, can be used to monitor reflectance of the ceiling to mitigate ceiling color offsets.

Color Rendition

The luminaire 100 may employ two channel packages that incorporate either a WW or CW emitter as a first channel and direct red emitting LEDs as the second channel. The ability to supplement the red portion of the spectrum with a narrow band source can achieve good color rendering criteria (P1, F3) while maximizing efficacy.

The use of direct red emitters overcomes deficiencies of certain narrow band phosphors by allowing supplemental narrow band red emission at the precise wavelengths required to achieve P1, F3 color rendition without incurring significant efficacy penalties.

The optical system of the luminaire 100 can mix the light from all light sources and provide uniform chromaticity with less than 50%, 20% or even below 10% variation across suitably defined target surfaces.

A direct red channel combined with intra-optic sampling allows the fixture to compensate for changes in efficiency and wavelength shift of the red emitters as operating conditions change.

For example, simulations of the LED die and phosphors used in the Nichia H5 and F1 families of products show that efficacies of 215 lm/W can be achieved at CCT values of 2700 K to 5000 K that meet TM-30 P1, F3 requirements.

Chromaticity

Chromaticity control (CCT tuning) can be provided by use of three color channels: two phosphor converted color channels and a direct red emitting channel. $D_{uv}$ can be a metric for degree of color shift based on the CIE 1976 (u'v') diagram, meant to achieve distance in u'v' space being proportional to a difference in color perception. The threshold for noticing a color shift is typically $D_{uv}$=0.001. By themselves, the phosphor converted channels may have nominal CCT values of 3100 K and 6300 K with $D_{uv}$>0.005. It is important to note that such phosphor converted primaries may have low percentage of emission from red phosphors which improves chromaticity stability over time. The low phosphor converted red content also allows higher efficacy performance of these channels.

According to the present technology, a red channel may be associated with each phosphor converted channel and then be used to shift chromaticity to lower CCT and lower $D_{uv}$. These channels along with intra-optic sampling allow the fixture to maintain chromaticity stability over time and also enable $D_{uv}$ tuning over the entire CCT gamut.

The phosphor converted primaries can be selected by modeling the performance of certain die and phosphor materials. In a simulation (see, FIG. 5C, described above), over 10,000 spectra were generated with chromaticity coordinates that fell within CCT=2400 K to 6500 K and $D_{uv}$=−0.008 to 0.002. 60% of these spectra did not meet at least TM-30 P2, F3 requirements. The remaining spectra were compared and analyzed to determine the highest efficacy combinations of phosphors and direct red emitters that would meet TM-30 P1, F3 requirements. These results were generalized into models for WW and CW primaries that allowed efficacy levels of >215 lm/W over the entire CCT gamut of 2700 K to 5000 K.

White Point Tunability

The ECM 114 can tune the white point by mixing two independently controlled warm and cool LED channels along with two independently controlled sub-channels of red and blue LEDs.

A microcontroller (MCU) may be employed in the luminaire 100 to add the sub-channel red and blue content as needed to ensure chromaticity and $D_{uv}$ requirements are met over the entire white-tunable range. Such a MCU can be configured to generate two Pulse Width Modulation (PWM) outputs which may then be low pass filtered and then applied to the respective LED channels. The PWM value ranges from 0 (full OFF or reverse) to 512 (full ON or reverse). Thus the step-size current control is 1/512=0.2%. This allows mixing of each channel with relatively high precision, since the LED's intensities are directly proportional to current.

Color temperature stability can be further enhanced with a high-dynamic range (250M:1) color sensor IC (https://ams.com/as73211) optically coupled to the light guides 122 for LED optical mixing and extraction. The nearfield CCT is read by the MCU which uses it to trim each channel as needed to offset LED thermal and aging CCT drift. The color sensor itself uses a novel thin-film based CIE1931 interference filter, this eliminates filter aging drift and UV-induced filter degradation. Other color sensors which use dye-based filters are subject to drift, and/or lack sufficient dynamic range.

The luminaire 100 may be configured to maintain the LEDs' temperature≤60° C., e.g., through heat sink 134, cover 116, or both. Chromaticity can be maintained by spectral addition of the noted sub-channel (e.g., red) LEDs as needed across the tunable range, along with closed-loop CCT sensing using a high-dynamic range, low-drift sensor.

Glare Control

Glare is a human response to a set of physical conditions. There are two primary sources of glare which the instant technology addresses. The first is high intensity light directed into the eye of an observer. The second is high contrast between light from the luminaire 100 and the surrounding environment.

For direct light, the optical system can be configured to shape a beam of light with sharp cut-offs and uniform illumination of the target surfaces. The luminaire 100 can be configured to provide uplight for indirect illumination. The luminaire 100 may be configured to provide tunable uplight which can be adjusted to momentary lighting needs. Indirect illumination can help create a pleasant and productive work environment and mitigate glare from contrast.

For beam shaping, the optical system comprises a combination of compound parabolic concentrator (CPC) injection optics and a light guide to control and maintain etendue. Such an optical system can be configured to provide beams of light without stray light that would otherwise enter the eye of an observer at angles typically considered as glare. The optical system may employ large castellations in the light guide exits to reduce low-angle beam emission. Baffles or external reflectors can be employed to provide sharp beam cut off angles but will reduce optical efficiency.

The optical system can be configured to provide uplight with a beam distribution having no light below a small angle such as 3, 4, 5, 6 or other degree above the horizontal such that no uplight contributes to glare. Properly directing some uplight to suitably illuminate the ceiling adjacent to the luminaire 100 further reduced glare by decreasing the ratio between luminance of the luminaire and the luminance of the background. As such glare can be controlled and a unified glare rating (UGR) 18, 17, 16, 15 or even less than 15 provided. Additionally, uplight can also provide a pleasing, indirect source of illumination from the ceiling/plenum.

Temporal Light Modulation (TLM)

Channels of the LED packages can be driven by a high-performance switching mode driver IC (https://www.onsemi.com/pdf/datasheet/ncl31000-d.pdf) which provides a constant current source.

The driver IC's switching frequency can be set to about 500 kHz. This is a good frequency because it allows the required inductors and other components to be physically small, and the switching artifacts can be readily filtered out. However, a potential downside to operating at high frequencies is electromagnetic interference (EMI). To mitigate EMI, the driver IC operates in "spread spectrum" mode. In this mode, the 500 kHz switching frequency is periodically shifted, by up to +/−3%. Thus the switching noise artifacts range from 485 kHz to 515 kHz and include small 2nd and 3rd harmonics near 1 MHz and 1.5 MHz. Such frequencies are two orders of magnitude above the upper frequency definitions for stroboscopic effect visibility measure (SVM) and flicker, and do not contribute to TLM.

A microcontrol unit (MCU) can be used to control the drive current of each LED channel using pulse width modulation (PWM). The MCU can be configured to generate two fixed 2.048 kHz square wave signals with variable duty cycles. Such PWM signals may then be converted into a smooth analog control voltage by passing them through a two-pole low-pass filter. The example luminaire may employ a two-pole filter for good filter transients and suppress harmonics generation from fast rise and fall times of the digital signal. The resultant analog control voltages are fed to the driver IC's analog control inputs for dimming and white/color tuning.

The 2.048 kHz PWM signal is the fundamental modulation frequency, however SVM is typically only defined up to 2 kHz (Miller, Naomi. Flicker Metrics and other Quandaries, PNNL 2019). A plot of SVM vs PWM rate using Fourier expansion for a square wave suggests our SVM is 0.25 (Wood, Mike. "Flicker, stroboscopic effect, and SVM", FIG. 3, 2021).

Dimming Range

As noted, dimming can be managed by the MCU. The MCU can generate two 2.048 kHz signals with variable PWM duty cycles-one to set the intensity of the WW LED channel, the other to set the intensity of the CW LED channel.

The MCU can be configured to determine the duty cycle of each of the two PWM signals based on a 9-bit binary counter. Each counter can have a range from 0 (e.g., full OFF) to 511 (e.g., full ON). The smallest change in the counter is 1 part in 512, which is 0.2%.

The MCU can provide PWM signals as variable-width 3.3V square wave signals with a frequency of 2.048 KHz. LED driver ICs (e.g., NCL31000 and NCL31001 from ON Semiconductor, Phoenix, AZ) may be used and can offer two dimming control options. The highest-resolution option is to supply them with an analog voltage input which ranges from 0 to 2.4V. To accomplish this, each digital PWM signal can be converted into a smooth, continuously variable analog voltage by passing it through a two-pole low-pass filter circuit, then scaling it to produce 2.4V (full on) when the PWM signal is 100%.

Per datasheet, the noted driver IC is capable of deep dimming to zero (0%) with 0.1% accuracy when operating in high-resolution analog control mode. The limiting factor for resolution is the step-size of the PWM channels, which is 1 part in 512 or 0.2%. To account for small non-linearities in the low-pass filters and LED I/V curves, component value tolerances, and other error sources, effective resolution may be limited to 0.4%.

To maintain chromaticity/white point, each of the WW and CW LED channels can be augmented with one or more additional channels of e.g., red or optionally other LEDs. For this purpose, the MCU selectively adds these secondary spectral components as needed across the white-tunable range of the luminaire.

Furthermore, a high-dynamic range, low-drift charge-coupled transistor sensor can be optically coupled to the mixed LED light as part of a feedback loop.

Lighting Control System

Figure 6:
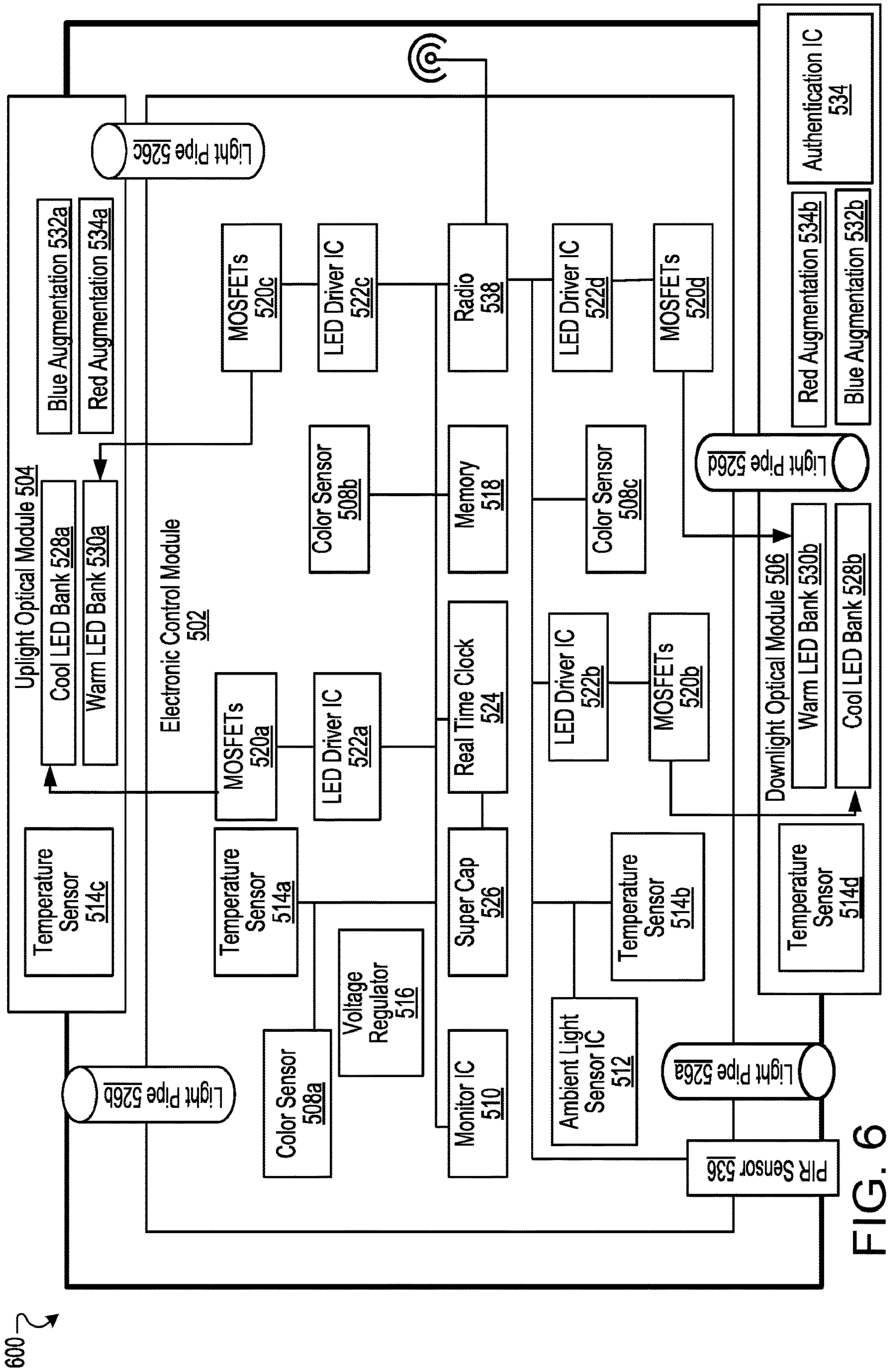
FIG. 6 shows a block diagram of components of the luminaire and the lighting control system.

FIG. 6 shows various aspects for connection and network formation of the lighting control system 50. Lighting control system 600 can include an electronic control module (ECM) 502, e.g., ECM 114. The ECM 502 can connect to an uplight optical module 504, e.g., for indirect lighting, and a downlight optical module 506, e.g., for direct lighting.

The ECM 502 can include various sensors, such as color sensors 508*a*, 508*b*, and 508*c* and temperature sensors 514*a* and 514*b*. The colors sensors 508 can use thin-film interference based on the CIE 1931 or DIN 5033 and provide little to no filter drift over temperature and time. The color sensors 508*a* can provide a large dynamic range, e.g., 250M:1, and sensitivity, which can enable closed loop control. The color sensors 508 can be, for example, ams AS7321 digital XYZ color sensors. The ECM 114 can store data collected by the sensors for use in evaluating performance and determining operational parameters.

Additionally, the ECM 502 can include voltage regulator 516 and a real time clock 524 connected to a super cap 526.

The ECM 502 can include various integrated circuits (IC), such as monitor IC 510, LED driver IC 523A, 523B, 522*c*, 522*d*, and ambient light sensor IC 512. The monitor IC 510 can produce 12-bit voltage and 12-bit current measurements and provide 24-bit power results with small error, e.g., 1.5% total unadjusted error. The monitor sensor can be, for example, an analog device such as a LTC2945 wide range, high precision power monitor IC.

The LED driver ICs 522 can provide high efficiency, e.g., 97% per mfg datasheet, buck, integrate diagnostics and fault detection, dim to zero with 0.2% accuracy, have a switched mode power supplies (SMPS frequency) at 500 KHz, spread spectrum, and a pulse-width modulation (PWM), e.g., fundamental transmission line matrix (TLM) frequency, of greater than 2 KHz.

The ECM can include radio 538, which can be based on a 64 MHz ARM Cortex-M4. The radio 538 can be multi-protocol, e.g., 802.15.4 ratio (Thread, BTS), have 512 KB of flash memory, and 128 KM of RAM memory, have low quiescent and transmitting power, and be a OpenThread certified component. The radio zz24 can be, for example, a Nordic Semiconductor nRF52833 ARM MCU with a multiprotocol radio.

Within the ECM 502, MOSFETS 520*a*, 520*b*, 520*c*, and 520*d* can connect to the cool LED bank 528*a*, warm LED bank 530*a*, cool LED bank 528*b*, and warm LED bank 530*b*, respectively. The MOSFETS can have a relatively high efficiency.

Light pipe 526*a* can connect to the ambient light sensor IC 512, be used for daylight harvesting, blocking IR and UV light, and have exceptional dynamic ranges and sensitivities. The ambient light sensor IC 512 can be, for example, ams TSL2572.

Additionally, a PIR sensor 536 can use ASIC to reduce false triggering and have a flat lens for a streamlined luminaire appearance. The PIR sensor 536 can be, for example, Panasonic EKMC161011 PIR sensor.

Light pipe 526*b* can measure the color and irradiance of light reflected from the ambient surroundings, e.g., the ceiling, which can be used to offset the ceiling color. Light pipes 526*c* amd 526*d* can guide light to the optics of the uplight and downlight optical modules 504 and 506, respectively.

Each of the uplight and downlight optical modules 504 and 506 can respectively include a temperature sensor, such as temperature sensors 514*c* and 514*d*, e.g., microchip MCP9808, one or more cool LED banks, e.g., cool LED banks 528*a* and 528*b*, one or more warm LED banks, e.g., warm LED banks 530*a* and 530*b*.

Each of the cool LED banks 528*a* and 528*b* can have a respective blue light augmentation, e.g., blue augmentation 533A and 533B. The microprocessor controlled sub-channels of the selected blue and red LEDs can provide SPD "add-in" to achieve color quality metric across the 2700-5000 K range.

Each of the warm LED banks 530*a* and 530*b* can have a respective red light augmentation, e.g., red augmentation 534*a* and 534*b*. Additionally, downlight optical module 506 can have an authentication IC 534, which can be a robust internet of things (IoT) authentication device, assure the downlight optical module 506 us certified for use in a luminaire, e.g., prevent unsafe, low efficacy "clones." The authentication IC 534 can contain 2 KB of non-volatile memory programmed at factory with LED-specific information, optics, lens type, and the like and store cumulative operating hours. An API can query the stored hours, LED type, lens type, and the like. The authentication IC 534 can be, for example, an Infineon SLE95402 secure authentication IC.

In some implementations, the entire ECM 502, each of the uplight and downlight optical modules 504 and 506, e.g., including the LEDs and optics, or a combination thereof are field-replaceable.

Fault Detection and Diagnostics

The lighting control system 600 may be configured to identify and report faults in the system, for example device/equipment errors, loss of network communication or other faults. Such faults may be reported or made available automatically, for example to building operators.

For example, LED-related faults and warnings may be signaled to the MCU by a suitable component, for example LED Driver IC 522, e.g., a NCL31001 driver ICs. Each LED channel can have its own driver IC. Such ICs can have several (e.g., nine) status monitoring bits which are set when a particular condition is met. Severe LED faults may be thermal shutdown, LED open and LED overcurrent. These generate an interrupt signal to the MCU. Warning signals for each channel may be generated when programmed limits are exceeded for driver temperature, LED PCB temperature, for example, a temperature sensor per channel, LED thermal shutdown, LED overvoltage, LED undervoltage and LED overcurrent average. Other temperature sensors 514 may be near FET transistors and read by the MCU. The MCU can have an on-die temperature sensor. Sensors can be sampled at regular intervals and qualified via bounds-checking.

The LED driver ICs 522 may include a high-accuracy 10-bit ADC which may read its LED channel's voltage and current every 100 milliseconds.

Status bits per LED channel along with other information such as periodic V/I measurements may be stored in a 32 Mbit flash memory in the luminaire along with network status and energy usage data. This can be used to provide a long time (e.g., 29 months) of rolling trend and fault/warning history for Predictive Maintenance (PM) usage.

Furthermore, each LED package may include a suitable (e.g., 2 Kbit) memory device for storing lifetime characteristics (total operating hours, LED part type and bin data). A commercially-available example is an Optiga™ Authenticate S device from Infineon (Munich, Germany).

In combination, luminaire trend data and LED characteristics may be used to form a dataset which may be periodically sent to the Border Router (BR). For data analysis, the BR may use a pre-trained TensorFlow model (see, e.g., https://www.tensorflow.org) to evaluate the dataset, runs inference processing, and issues forward-looking PM alerts via its API.

Luminaire Level Lighting Control

The ambient light sensor IC 512 can include occupancy and/or ambient light sensors. Such sensors may be directly integrated or embedded into the luminaire, e.g., in lower sensor tower 106, during manufacturing or assembly. For example, the luminaire can have an embedded occupancy sensor, an embedded ambient light sensor (ALS), and two embedded high-dynamic range CCT color sensors.

An example occupancy sensor can be PIR sensor 536, e.g., Panasonic EKMB1201113 (Panasonic Industrial Devices, Newark, NJ). Such a sensor provides high immunity to false triggers and offers low power consumption. It is small, has a flat lens and can be unobtrusively integrated into the luminaire. It has a detection distance of about 5 m.

An example ambient light sensor (ALS) may be a TSL25721 IC (available from ams-OSRAM AG, Austria) which has a very high dynamic range (dark room to 60K lux sunlight). Its spectral response curve approximates human eye response, it rejects IR and UV, is only 2 mm×2 mm in size, and can enter "sleep mode" for extremely low power operation.

Example charge couple transfer sensors may be ICs AS73211 (available from ams-OSRAM AG, Austria) which can offer closed-loop color control of both the uplight and downlight. This sensor provides high dynamic range (250M:1) and stability. It uses a thin-film based CIE1931 interference filter to eliminate filter aging, drift and UV-induced degradation. Other color sensors may be used but dye-based filters are subject to drift, lack sufficient dynamic range, or both.

Such sensors may be included in one or more electronic control modules 114 (ECM) inside the example luminaire 100. The ECM 114 is a circuit board that may include all or a portion of the electronics necessary to operate the luminaire 100, e.g., not include the LED assembly. The luminaire 100 may include one ECM independent of its size or multiple ECMs. For example, depending on the length, the luminaire 100 may include one, two, three, four or more light sources 118 each with a respective ECM 114. Multiple ECMs may provide multiple ALS and PIR sensor distributed along the length of an elongate luminaire, which can provide more granular daylight harvesting and occupancy detection.

Sensor Readiness and Upgradeability

The electronic control module (ECM) 114 in luminaire 100 can include a MCU along with charge couple transfer sensors, ambient light sensors, occupancy detection and temperature sensor components. Additional sensors may be integrated directly inside an example luminaire. An example ECM can provide one or more high-speed digital busses (e.g., "I2C" and/or "SPI" etc) on-board. Such a configuration allows additional sensor modules to be added to a luminaire during manufacture, for example via pinned internal connector. Examples of additional sensors include $CO_2$ and CO sensors, microphones for glass breakage detection, vibration sensors, etc.

The luminaire 100 can be configured to operate luminaire communication, control and sensing electronics outside of the LEDs with small amounts of power. A prototype system showed under 120 milliwatts consumption. Nevertheless, luminaire 100 may include a D4i interface. Based on the ANSI C137.4-2019, however, an additional 3.0 Watts average and 6.0 W peak are needed for a D4i power supply. Furthermore, D4i sensors such as those for ambient light, temperature, occupancy detection and so on, included readily available electronic components which are often more cost effective to incorporate directly into the luminaire circuitry. By directly incorporating the sensor components we also reduce the overall component count and thus increase reliability.

Lumen Maintenance

The luminaire 100 can be configured to maintain 70% of the initial light output for at least 50,000 hours. Lumen maintenance is known to be controlled by two factors, drive current and case temperature ($T_{case}$). State of the art packages are able to achieve L70 values in excess of 50,000 hours (e.g., 60,000 hours or more, 70,000 hours or more, 80,000 hours or more) and L90 values in excess of 36,000 hours (e.g., 40,000 hours or more, 50,000 hours or more) when the LED packages are operated at their test/bin current and $T_{case}$=85° C.

The use of standard LED die, encapsulants, phosphors, and package materials in a new package format is expected to achieve the same reliability performance (lumen maintenance and chromaticity stability) when operated at the same die current and LED case temperature. Flux maintenance for LED packages operated at LED case temperatures of 85° C. and binning/test currents routinely achieve L70>50,000 hours (e.g., 60,000 hours or more, 70,000 hours or more, 80,000 hours or more), L90>36,000 hours (e.g., 40,000 hours or more, 50,000 hours or more) and $\Delta u'v'<0.002$ over 6,000 hours (e.g., 8,000 hours or more, 10,000 hours or more).

The luminaire 100 can provide low thermal resistance, e.g., it can operate the LED die at derated drive currents, for example at 50%, 40%, 30%, 28% or below their standard design current.

In conjunction with structural components of the example luminaire that also serve as heat dissipation elements, case temperatures can be 60° C. or less.

Chromaticity Maintenance

The luminaire 100 can be configured to maintain chromaticity over an initial 6,000 hours (e.g., 8,000 hours or more, 10,000 hours or more) of operation below a certain level, for example ≤0.002, calculated as the distance between coordinate pairs on the CIE 1976 (u',v') diagram.

As with lumen maintenance, chromaticity maintenance is dependent on drive current and case temperature of the LED package. Lower drive currents and lower case temperatures can increase chromaticity maintenance times.

Furthermore, the luminaire 100 can provide intra-optic sampling and a control system that can allow adjustment of the spectral content based on feedback and can provide the ability to compensate for changes in the efficiency and wavelength shifts of the red emitters due to changes in drive current and operating temperature. This may allow the system to precisely adjust the CCT of the emitted light and also maintain $D_{uv}=-0.003\pm0.001$ over the entire CCT gamut.

White Point Shift Due to Aging

The white point, in particular the correlated color temperature or more generally the chromaticity of the light provided by a light source can shift over time. Besides operating temperature, drive current etc., such shift typically occurs due to ageing of the light source and its components. Ageing refers to a cumulative effect of operating conditions on the components of the light source over time. Example effects may include chemical reactions and physical effects on light-emitted diode dies, encapsulant binders, phosphors, introduction of additional optical interfaces by delamination, cracking, or a combination thereof. Such effects may be mitigated by combining multiple light sources with compensating ageing effects such that mixed light of the combination exhibits less white point shift than light provided by any of the individual light sources themselves.

Driver Lifetime

The luminaire 100 can be configured to operate the drive system including the drive ICs, e.g., via power lines 112, at temperatures below the rated temperature.

Good efficiency provides little heat and extends lifetime. The luminaire 100 may include a two-stage driver architecture. The first stage may be a Class 2, 42 V DC supply which feeds up to 25 luminaire sections. The second stage can be an internal high-efficiency, high-frequency "buck" topology constant-current driver in each luminaire. In this example, projected effective lifetime is therefore based on both stages.

The primary heat source in relevant supplies used in both noted stages are known to be field effect transistors (FETs). Gallium nitride (GaN) FETs may be used instead of the traditional silicon FETs found in common SSL drivers. GaN FETs are considerably more efficient than silicon FETs, operate at lower temperatures (up to 20% cooler), and are more reliable. GaN FETs are available for example from manufacturers such as Transphorm (https://www.transphormusa.com/en/). Based on design criteria including high-reliability capacitors, lifetime in excess of 80,000 hours at 65° C. calibration point temperature can be expected.

The second, internal driver stage can also use GaN FETs. LED channels in the example luminaire may be configured to operate close to the supply voltage from the first stage of about 42 V. For example, drive voltages can be 8 to 10 V below 42 V to mitigate heat dissipation in the second stage. For example, driver ICs such as NCL31001 OnSemi offer high reliability and integration. With low component count and high reliability capacitors driver lifetimes of 50 k, 60 k, 70 k, 80 k or beyond at 65° C. calibration point temperature may be expected.

Replaceable Components

Components of the luminaire 100 may be field replaceable. Such components may include direct and indirect optical modules 102 and 104 (optics, LED board, heat sink) and electronic modules (ECM 114, electronic control module (ECM) board, sensors, sensor tower). Integrating components into modules can offer easy maintenance even while the luminaire 100 is still installed in situ. Modules may be configured to be easily accessed and replaced. Power and communications connections for optic and electronic modules may be made via pogo pins, plugs or other connectors The ECMs in example luminaires can communicate wirelessly via OpenThread. OpenThread provides the ability for each ECM to automatically become a "router" and commission new "end-devices" into the network as needed. This can make replacing the electronic modules, or adding or moving luminaires, seamless.

Similarly, the optical system may be modularly configured. Optical modules and electronic modules can be configured for ease replacement/upgrade in the field, further extending the useful lifetime of the luminaire. Replacing optical modules may provide different light distributions without further replacements or modifications.

Design for Disassembly (DfD))

The luminaire 100 may be configured to integrate components into easily handled modules positioned for unobstructed, easy access and disassembly. For example, replacing electrical connectors with pogo pins can reduce total detailed precision tasks.

Modular luminaire configurations can simplify maintenance and upgradeability in the field, and also simplify disassembly and end of life (EOL) processes. Modular design allows the same processes to be used for all lengths of pendants, and subassemblies may have their own disassembly lines. Such disassembly can streamline workforce training and simplify layouts for facilities, allowing dedicated module disassembly lines. Disassembly instructions may be included with the luminaire 100 itself via labels, booklets or otherwise.

To simplify DfD the number of materials used in the luminaire 100 can be kept small. For example, rather than a mix of materials, the design can use aluminum throughout. This can reduce the number of parts that need to be broken out and reduce the number of materials that need to be recovered/recycled.

Technical Interoperability

The lighting control system allows control of one or more suitably connected luminaires via a network. The network includes a border router with one or more luminaires. The lighting control system may be controlled from outside the network via the border router.

Figure 7:
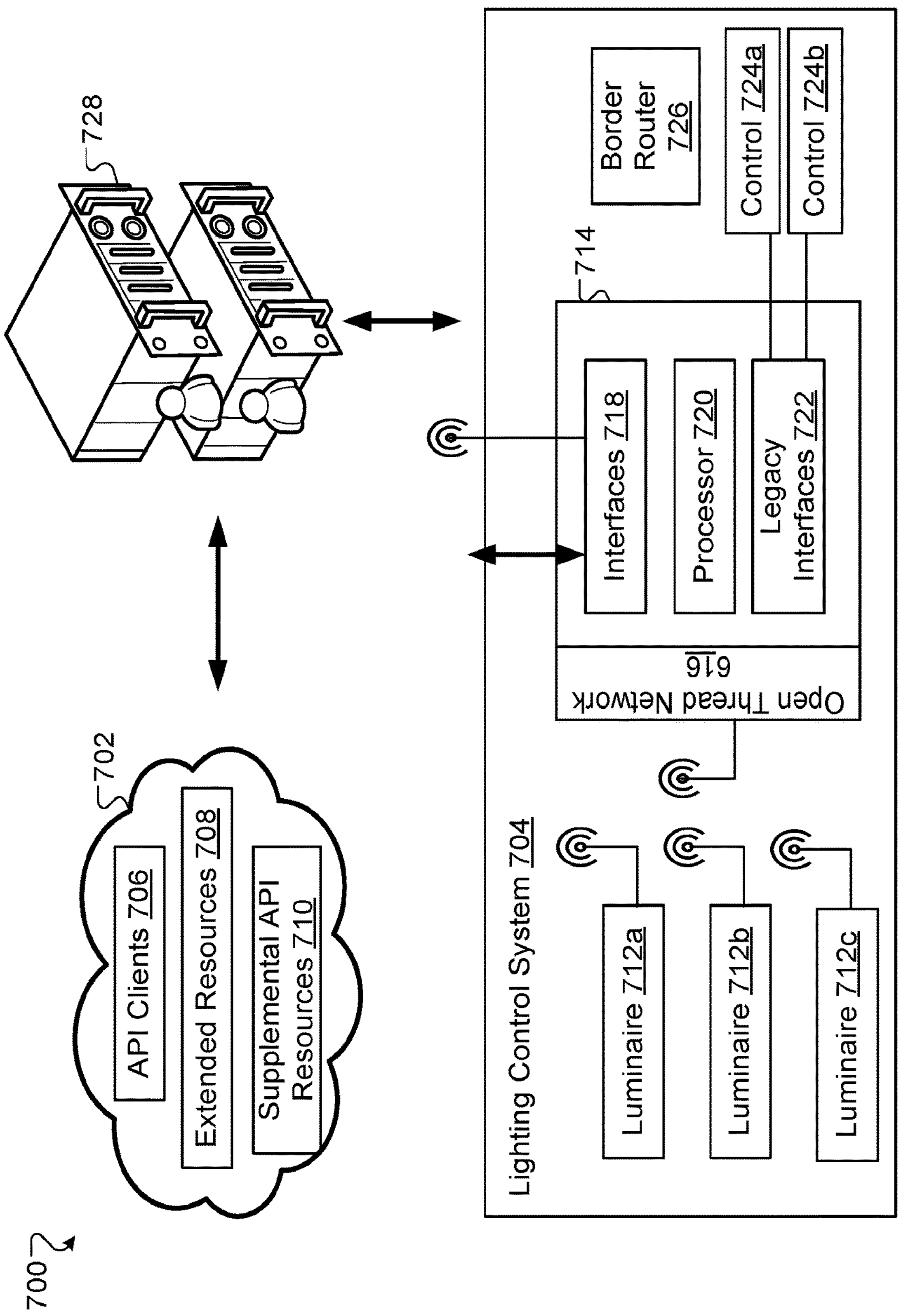
FIG. 7 delineates components of the lighting control system.

FIG. 7 shows an environment 700 for API (application programming interface) and internet partitioning in relation to a lighting system. The environment 700 can include an API 702, an API proxy 728, and a lighting control system 704. The lighting control system 704 can include multiple luminaires, e.g., luminaires 713A, 713B, and 712*c*, and network connections 714. The lighting control system 704 can be "on-site," e.g., in a museum or residence. The lighting control system 704 can be an example of lighting control system 600.

The luminaires 713A-c can be any of the luminaires as described in this disclosure and located "on-site," e.g., in a business or residence. Each luminaire can include a warm and cool LED uplight module and a warm and cool LED downlight module with secure authentication and NVRAM IC. In some implementations, the downlight module can include a secure authentication device, which can assure that the downlight optical module is certified for use in the luminaire, e.g., avoid unsafe and low efficacy clones. The downlight module can store non-volatile memory programs with LED specific information, e.g., optics and lens information. Additionally, the downlight module can store operational data, such as cumulative operating hours, LED type, and lens type, which are variable by the API 702.

The lighting control system 704 can include one or more network interfaces 718 incorporated into a luminaire 713A, 713B, 712*c*, or other components of the lighting control system to enable exchange of data within or beyond the lighting control system.

The interfaces 718 can include wired connection, Wi-Fi, Ethernet interfaces, or a combination thereof. Such interfaces 718 may employ IEEE 802.3 (Ethernet), IEEE 802.11 (Wi-Fi), IEEE 802.15.4 (ZigBee, 6LoWPAN), Bluetooth Mesh, Power over Ethernet (POE), e.g., Class 8 end device (PD), or other network technologies.

Wi-Fi may be used but is optimized for higher-bandwidth and accordingly has a higher power consumption. Wi-Fi typically demands a microprocessor with capabilities and memory resources beyond those needed for the luminaire's functions; this increases power consumption. In spaces where many occupants, devices, or both are using Wi-Fi, the presence of added nodes may increase the initial delay devices encounter when scanning for access points during the 802.11 network discovery process. Because Wi-Fi is pervasive and operates over long distances, it presents an "attack surface" for bad actors to compromise the network.

Bluetooth Mesh is good for retrofits and requires little power. It can communicate over long spans because messages can "hop" from node to node. But this is accomplished by "managed flooding", wherein each node rebroadcasts messages to neighboring nodes. This increases overhead and the latency of multi-hop messages. The delay for 4 hops can exceed 0.6 seconds (https://bit.ly/CE_OTL); undesirable for lighting.

Zigbee or Z-Wave may be used but have latency similar to BLE Mesh with improved routing. Also found in some lighting and home automation products, however, neither is widely supported by current smartphones or laptops, which reduces the available options for users to interact with the luminaires. Z-Wave is proprietary and limited to 4 hops.

The network connection 714 can include OpenThread network 716 (see, e.g., https://www.silabs.com/documents/public/application-notes/an1142-mesh-network-performance-comparison.pdf). OpenThread is built on IEEE 802.15.4 (6LowPAN/IPV6-based), has low latency, supports routing, provides security and resiliency, and is easily integrated into the Internet via a Border Router 726 (BR). The OpenThread network 716 can be self-healing, full routing, e.g., not flooding, jave 802.15.4 standard security, consume relatively low power, and be supported by Google, Apple, Qualcomm, and TI.

The BR 726 can implement the Ethernet and DALI interfaces. Nodes in the lighting control system 704, e.g., individual luminaires 613A-c, can operate in Bluetooth mode as well, for local commissioning.

Application Interoperability

The lighting control system 704 can include an application programming interface (API) 702 for application-level interoperability. The API 702 can provide access to 1) zone and individual luminaire occupancy data, 2) zone characteristics including luminaires within the zone and identifying characteristics about the zone (room name, space type, etc.), 3) fault detection and diagnostics (FDD) data, and 4) energy reporting data. Optionally, FDD and energy reporting data may be aligned. The API 702 may include developer documentation including authentication guide; API resources guidance including all endpoints, error codes, and debugging guidance; up-to-date changelog, and terms of use.

The present technology can employ a RESTful API interface. This can be implemented in the OpenThread Border Router (BR) 726, which can be implemented by processor 720 as a Linux™-based device, e.g., industrial grade freescale I.MX6 embedded Linux, and operated at edge of the lighting control system 704. Luminaires 712*a-c* can be configured to communicate information with the BR 726 such as their resources and methods via the API. Such information can include zone and occupancy data, identifying characteristics, FDD data, and full energy reporting data.

BR 726 can bridge the OpenThread network 716 in the lighting control system 704 to the internet and provide OpenADR2.0b functionality and API services. The BR device may be powered by a commercial UL-Listed 12V DC low-current PSU or other suitable power supply.

In some implementations, the BR 726 uses TensorFlow Lite Predictive Maintenance model on-device, implements physical legacy interfaces 722 e.g., DALI-2 and 0-10 interfaces, virtualizes them for lighting, e.g., DALI address mapping into luminaire's native IPV6 addresses, coordinates multi-luminaire lighting control strategies, accesses external API resources if used in those strategies, provides a web-based local lighting control strategy definition and a system maintenance "dashboard for facility managers, uses an industrial class MPU and components with relatively committed long-term support, e.g., not an educationally focused "Raspberry Pi" or "Maker," or a combination thereof. In some implementations, the BR 626 is supplied in a 3"×5"×2" ruggedized aluminum enclosure.

External API "consumers" (utility companies, Internet service provider, facility managers, content/information aggregators, and hardware or software manufacturers) access the network via a Cloud service provider such as Amazon API Gateway as an API proxy 728 instead of accessing buildings directly. The API proxy 728 issues tokens to trusted entities, e.g., utilities or ISOs, enforces quotas, prevents throttling and maintains audit logs. The API proxy 728 provides traffic management, CORS support, authorization and access control, throttling, monitoring, quota enforcement, audit logs, and API version management. API clients 706 can include facility managers, utilities, ISOs, and the like.

The API 702 can include extended resources 708 from similar or identical lighting systems in other rooms and buildings that are preauthorized for lighting control strategy usage, e.g., API access to local occupancy, daylight sensors, and DALI-2 controls.

The API 702 can include supplemental API resources 710, which are preauthorized for lighting control strategy usage, e.g., National Weather Services's Sever Weather alert API.

An API contract can be defined using OpenAPI (OAS 3.0). A benefit of using OAS is that it streamlines documentation rendering and versioning, which is visualized using open-source Swagger UI. Swagger UI is also a platform for authorized client-side developers to execute any API request and validate responses before integrating it into their code base. To support a wide range of Smart Building operators, the lighting control system 704 may be configured to support a wide variety of languages and frameworks for control. For example, Codegen 3 may be employed to aid in the generation of API client libraries (SDKs) and server stubs. This may greatly simplify client-side integration and adoption of the present technology.

The lighting control system 704 may be configured to provide APIs 702 which have extended value for Lighting Designers/Planners by providing ad-hoc lighting distribution maps for buildings. For example, luminaire 712 components can be a field-interchangeable modules. End-users can be given options of installing modules with different light distribution patterns in luminaires 712 based on certain requirements. Such modules can contain one or more factory-programmed memory devices with light distribution pattern information, installation date and other information. Such data may be exposed as read-only information to the API 702.

Addressability

The lighting control system 704 may be configured to allow unique identification and/or addressing one or more of its components. The lighting control system 704 may further allow for configuration and reconfiguration of devices and control zones independent of electrical circuiting.

As noted, the lighting control network may employ an OpenThread network 716 (see, e.g., https://www.threadgroup.org/What-is-Thread/Overview)), which is based on IEEE 802.15.4 and uses 6LowPAN for its upper layers and addressing scheme. OpenThread is IPV6 compliant which provides a 128-bit address scheme with 3.4×10^38 unique addresses for devices.

Luminaires 712, Border Routers 726 and other components of the lighting control system 704 may be configured with unique IPV6 addresses. IPv6 addressing allows each device to be individually identified, controlled, and configured, irrespective of their electrical circuiting.

IPv6 addressing permits easy interconnection of the lighting control system 704 with the Internet via the Border Router 726 and its API 702. There need not be restrictions with regard to rooms, buildings or geolocation when lighting assets are securely accessed via the Internet.

The lighting control system 704 may be configured to interface with legacy controls 722, such as DALI controls, which are present in many buildings. DALI uses a different addressing scheme and is limited to 64 unique device addresses. To facilitate DALI controls, the Border Router 726 may be configured with a DALI interface and use lookup tables to map DALI addresses into native IPV6 addresses for each luminaire 713A-c. In this manner, such luminaires 712 can be assigned a unique IPV6 address, and a locally assigned DALI proxy address for the purposes of interfacing with DALI devices.

Energy Reporting

The lighting control system 704 may be configured to separately report energy use for luminaires 712 and other components of the lighting control system. Energy data may be reported for certain intervals, for example 15-minutes or shorter and may be reported via one or more of the noted network interfaces. The lighting control system 704 may be able to store data for a certain period of time, for example 24 months. The lighting control system 704 may use automated energy measurements, report accuracy of provided data and the methodology for determining accuracy must be documented.

At a luminaire-level, voltage and current measurements may be performed using a 12-bit Delta-Sigma Analog-to-Digital Converter, e.g., by the monitor IC 510, having less than +0.75% Total Unadjusted Error, per the IC manufacturer's datasheet (LTC2945 Power Monitor IC, Analog Devices, Wilmington, MA). This can yield a 24-bit power result at +1.50% Total Unadjusted Error.

Such power data along with additional measurements (each LED channel's forward voltage and temperature, the driver FET temperatures, network status, occupancy and light sensor information or other information) and a timestamp can be formatted as a 32-byte record. Such records may be stored at certain intervals, for example, every 10 minutes in each luminaire and/or elsewhere. The 32-byte record can be stored in a 32 Mbit serial flash memory device. This can provide 29 months of energy usage data. A 32 Mbit memory stores 4,194,304 bytes. A month of 32-byte records requires 140,160 bytes. 4,194,304/140,160=29.9 months. The memory may be managed by the MCU as a circular data structure, so that after 29.9 month's of data, each new record overwrites the oldest record.

Historical energy consumption and device-level "health data" records may be available to the API via the OpenThread Border Router (BR) in the network. Storing information in the luminaire allows the luminaires to be freely repositioned, for example between different buildings, etc., or taken off-line without the need to update records in the BR. Previously used luminaires may be configured to allow deletion of data when commissioned into a new network.

Each luminaire may include a real time clock 524 to initiate storage sequences and time stamp data, for example by sending a suitable signal to the microcontroller. This may be employed to enhance reliability. If the sequence was initiated via a command sent by the BR 726, it would be subject to network disturbances. With time stamps, records can continue to be collected, and be logged during network disturbances.

Lighting Control Strategies

The lighting control system 704 may be configured to provide task tuning, scheduling, occupancy sensing, daylight harvesting and/or other lighting control strategies while being capable of manual control of lighting by a building occupant.

The MCU in a luminaire may execute one or more local lighting strategies, either independently or under supervision of the Border Router (BR) device, e.g., BR 726, at the network's edge. Lighting control strategies and schedules are prepared and managed via API 702.

Different luminaires or groups of luminaires may follow different lighting control strategies. Groups of luminaires on a network may be downloaded by the BR 726 to the luminaires and stored in the luminaire's on-board flash memory, e.g., memory 518, and executed locally as required. This may provide resilience in case of network or BR disturbances.

The on-luminaire resources available to the luminaire's MCU may include a low-drift NTP-synchronized Real Time Clock (RTC), e.g., real time clock 524, ambient light measurements, CCT measurements, power consumption data, and occupancy detection data. Furthermore, the BR 726 may provide a DALI-2 compliant wired interface implemented in the BR for full manual control.

Additional resources available to a luminaire's MCU may include: a) one or more measurements made by other luminaires in the same network; b) one or more measurements made by luminaire networks in other rooms, buildings, etc. via their API; and/or c) off-premises resources which may be provided by the BR 726 via API 702 calls through the Internet, for example local weather conditions to determine outside temperature and cloudy conditions. Suitably configured lighting control system may follow one or more lighting strategies. One example is sequentially brightening and dimming the path along a corridor in advance of a moving occupant (e.g., the strategy leverages sensor data from neighboring luminaries); a second example is task tuning based on whole-room and whole-floor movements, weather, cost of energy, etc.; a third example is leveraging DALI-2 control devices on the main floor to manually control multiple rooms and groups with networks.

System Resilience

The lighting control system 704 may be configured to mitigate loss of connection to the Internet. Mitigation may allow partial or full operation of lighting control strategies (task tuning, scheduling, occupancy sensing, daylight harvesting, manual control, etc.). The lighting control system 704 may be configured to continue to operate in their pre-programmed state prior to loss of network connection. The lighting control system 704 may be configured to resume lighting control strategies up to a certain period following loss of connection to electrical power, for example for up to 48 hours. The lighting control system 704 may be configured to retain one or more lighting control strategies upon loss of electrical power.

Luminaires may be configured continue to execute their configured lighting control strategies during a loss of connection to their next-higher element, which is the Border Router (BR) device, e.g., BR 726.

A lighting control strategy assigned to a luminaire may be sent by the BR 726 and stored in an on-board flash memory, e.g., memory 518, inside the luminaire which provides 10 years of data retention.

The MCU in a luminaire may be a low-power MCU to execute its lighting control strategies. The on-luminaire resources available for the MCU to implement lighting control strategies may include a low-drift (+/−2 minutes per year) leap-year corrected NTP-synchronized Real Time Clock (RTC), sensors for ambient light, CCT measurement and power consumption data, as well as occupancy detection data. During a power-fail event the RTC may continue to operate via a trickle-charged supercapacitor in excess of 90 hours.

The lighting control system 704 may allow for remotely administered luminaire firmware updates over the network to enhance or update their functionality. When updating, the MCU may not be available for short period of time, e.g., 30 seconds, to control the luminaire. As such the MCU may be configured to first issue a command to the LED driver IC to store the current brightness values into the driver ICs' hardware registers, and the driver IC takes control before the MCU begins the update or re-boot process. This may occur without apparent interruption of operation of the luminaire. Once the update process is complete, the MCU can re-establishes direct control of the LED driver.

Grid Service Capabilities

The lighting control system 704 may be configured to reduce its energy consumption in a predefined way, on a temporary basis, in response to a signal (i.e., from a utility) without manual intervention and/or other ways. Methods for configuring responses of the lighting control system associated with such conditions may be accessible through a user interface (UI). The lighting control system may use OpenADR 2.0b functionality, which may be provided by the Border Router (BR) 726 using openLEADR (see, e.g., https://www.lfenergy.org/projects/openleadr/).

The BR 726 may be configured to provide dashboard via the UA to define the system's demand response (DR) logic. This may include the ability to configure DR price signal and other event responses, and "named group" responses which may be mapped to specific, user-defined sets of luminaires. Group responses may be conditioned by the sensors embedded in any luminaire in the network and/or by a supplied list of external APIs (e.g., API for current weather and critical alerts).

The lighting control system 704 may be configured to allow authorized users direct access to the BR via an IP address or URL from a browser. The BR renders the dashboard as a set of web pages, including user help information. Transport layer security (TLS) may be used to secure traffic. The BR 726 may be configured to log user sessions and client IP addresses. Such a log may be interrogated through a set of restricted API calls for auditing purposes.

The dashboard may allow users to place luminaires in named groups, such as "Room B3". A default may be set, for example all luminaires may respond to the configured DR logic for the network. Groups may be configured with their own DR logic taking precedence over default rules. Ramp rates may be configurable. If a group is set to ignore DR events, the BR 726 can be configured to not request responses. Named groups may be configured to respond conditionally. For such purposes, the UI may be configured to allow the group to "qualify" DR events through one or a set of daylight and occupancy sensors embedded in one or more luminaires in the lighting control system. Sensors in luminaires near windows and a multiplicity of occupancy sensors may be available to one or more groups of luminaires for greater sensitivity. A group's DR logic that includes use of an external API, may allow the API to be polled periodically by the BR and provided to the group.

Ease of Installation

Figure 8:
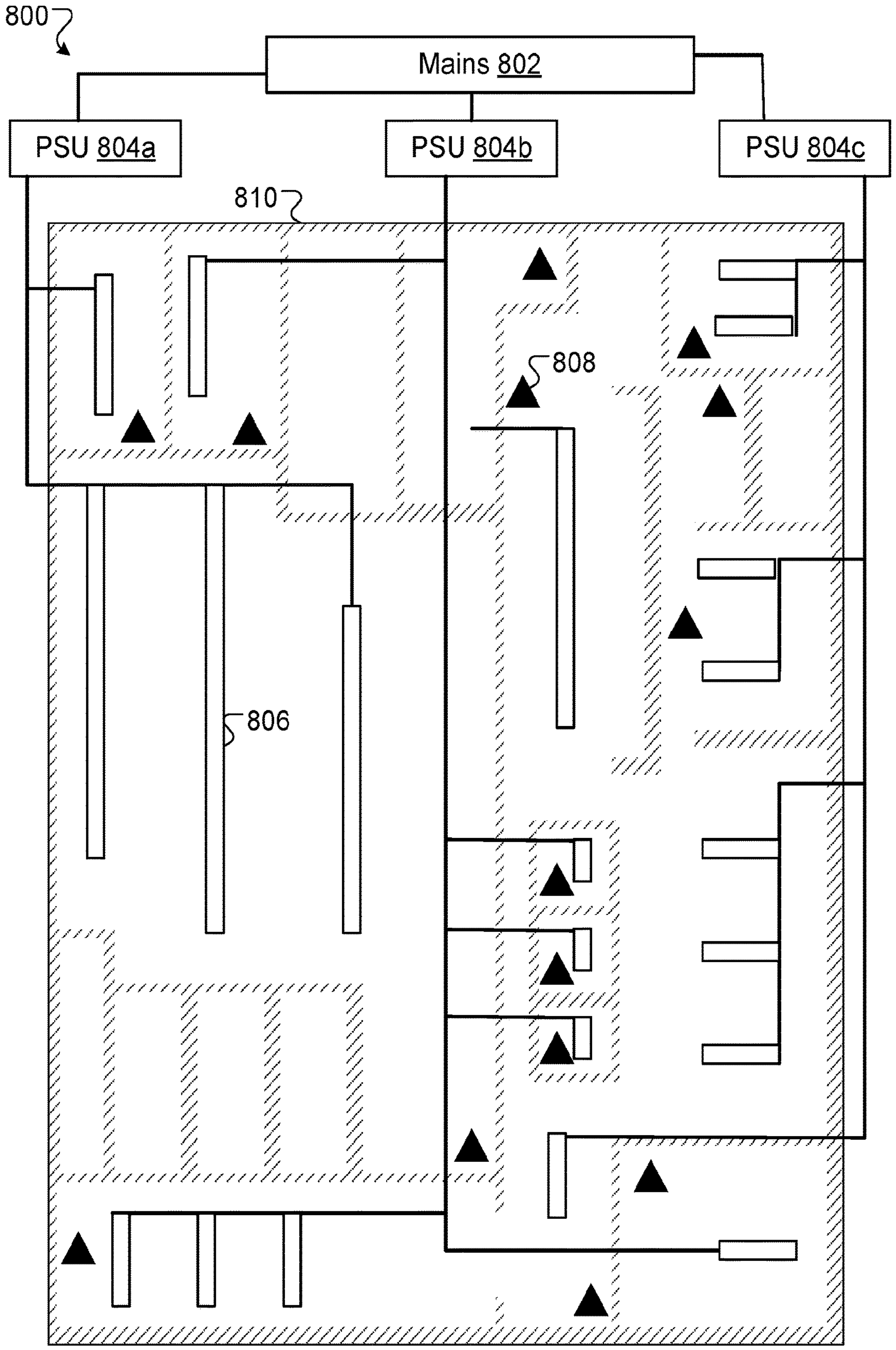
FIG. 8 shows a schematic floorplan of an example lighting control system.

FIG. 8 shows a schematic floorplan 800 of an example lighting control system. The system can include a mains utility 802, personal supply units 804*a-c*, node fixtures 806 indicated by solid rectangles, and manual scene controllers 708 indicated by black triangles. As indicated in FIG. 8, a single PSU, e.g., PSU 804*a* can power multiple fixtures nodes and connect to other PSUs. Rooms within the floor plan, indicated by solid white sections, can have one or mode node fixtures 806. Some rooms include a combination of node fixtures 806 and manual scene controllers 808, while some rooms have one or the other.

The manual scene controllers 808 can be battery powered, OpenThread compatible, or both. The node fixtures 806 can include a luminaire as described in this disclosure, a daylight sensor, and motion sensor.

One or more components of the lighting control system may be Class 2 appliances (IEC 61140). This may include power supply units (PSU), luminaires, BR devices and other components of the lighting control system. In some examples, luminaires communicate wirelessly but are still wired for power supply in a parallel configuration with the PSU.

The lighting control system, including cabling and interconnect components and so forth, can be configured to be fully compliant 2020 NEC Article 725 requirements. Such a system can meet the criteria for low-voltage lighting per 2020 NEC Article 411. Namely, it can operate with less than 60 VDC (e.g., 42-48 VDC) and the external Class 2 PSU may be rated 12.5 A or up to 25 A maximum. The PSU may include an overcurrent protection device.

The lighting control system may be configured to comply with UL-2108 6 Dec. 2019. It may be Class 2 device, intended for dry locations, and may be Type Non-IC. Luminaires may be configured for suspension mounting from a ceiling or overhead surface, and can meet Section 27, 64 and all other requirements.

One or more components of the lighting control system can have internal fuses serving as supplementary overcurrent protection devices (OCPD).

Use of a 42-48 VDC supply voltages can facilitate battery switchover configurations (with 48V nominal battery voltage systems) for installations where lighting outages must be avoided. 48 V is a common intermediate voltage used in high reliability battery backed up server rooms.

A number of embodiments are described. Other embodiments are in the claims.

What is claimed is:

1. A light emitting device, comprising:

a first LED die having a peak emission wavelength L1 in a blue or shorter wavelength;

a second LED die having a peak emission wavelength L2 in a red, orange, yellow, green, or cyan wavelength; and a homogenous light conversion material positioned to receive light emitted from the first and second LED dies, the light conversion material comprising:

a first phosphor compound having a peak emission wavelength LP1 in a green wavelength;

a second phosphor compound having a peak emission wavelength LP2 in an orange wavelength; and a third phosphor compound having a peak emission wavelength LP3 in a red, orange, yellow, green, or cyan wavelength;

wherein the light emitting device is a packaged LED device and a relative concentration of the first, second, and third phosphor compounds in the homogenous light conversion material, and a relative luminosity of the first and second LED dies are selected so that the light emitting device, during operation, emits white light having a spectral power distribution satisfying a preference P1 and a fidelity F3 according to a TM-30 standard for color rendering.

2. The light emitting device of claim 1, wherein both L2 and LP3 include a red wavelength.

3. The light emitting device of claim 1, wherein L2 includes a red and a cyan wavelength and LP3 includes a red and a cyan wavelength.

4. The light-emitting device of claim 1, wherein during operation, a luminaire containing the light-emitting device outputs light having at least F2 fidelity according to the TM-30 standard for color rendering.

5. The light-emitting device of claim 4, wherein during operation, the luminaire containing the light-emitting device outputs light having at least F1 fidelity according to the TM-30 standard for color rendering.

6. The light-emitting device of claim 1, wherein during operation, the luminaire containing the light-emitting device outputs 200 or more lumens per Watt of input power.

7. The light-emitting device of claim 1, wherein the light conversion material has multiple peak emission wavelengths between 580 nm to 650 nm.

8. The light-emitting device of claim 1, further comprising an encapsulant including the light conversion material, the encapsulant encapsulating the first LED die and the second LED die on a surface of a substrate.

9. The light-emitting device of claim 8, further comprising at least a portion of an electrical circuit comprising the first LED die and the second LED die, the electrical circuit being configured to provide independent control of a first amount of power supplied to the first LED die and a second amount of power supplied to the second LED die.

10. The light-emitting device of claim 1, wherein L1 is in a range from 360 nm to 490 nm.

11. The light-emitting device of claim 1, wherein LP2 is in a range from 550 500 nm to 650 nm.

12. The light-emitting device of claim 11, wherein LP3 is in a range from 580 nm to 650 nm.

13. A luminaire, comprising:

the light-emitting device of claim 1; and a solid optical assembly arranged with a first light entry surface facing the light-emitting device, the solid optical assembly being configured to receive light from the light-emitting device at the surface and output the light from one or more light exit surfaces.

14. A system, comprising:

one or more luminaires according to claim 13; and an electronic control system in communication with the one or more luminaires via a network, the electronic control system being programmed to control a brightness and a color of light emitted by the one or more luminaires.

* * * * *